(12) United States Patent
Hattori et al.

(10) Patent No.: US 7,920,056 B2
(45) Date of Patent: Apr. 5, 2011

(54) DRIVING SUPPORT APPARATUS

(75) Inventors: Toshihiro Hattori, Okazaki (JP); Kiyonari Kojima, Aichi-ken (JP); Mitsuyasu Matsuura, Chiryu (JP); Naoki Kamikawa, Nishio (JP); Mitsuru Fujita, Toyohashi (JP)

(73) Assignees: Denso Corporation, Kariya (JP); Nippon Soken, Inc., Nishio (JP)

( * ) Notice: Subject to any disclaimer, the term of this patent is extended or adjusted under 35 U.S.C. 154(b) by 432 days.

(21) Appl. No.: 11/986,639

(22) Filed: Nov. 21, 2007

(65) Prior Publication Data
US 2008/0122604 A1 May 29, 2008

(30) Foreign Application Priority Data

Nov. 29, 2006 (JP) ................ 2006-322134

(51) Int. Cl.
B60Q 1/00 (2006.01)

(52) U.S. Cl. ........ 340/441; 340/435; 340/436; 340/437; 340/438; 340/425.5; 340/440; 340/444; 180/167; 180/271; 701/2; 701/36; 701/41; 701/301; 348/148; 348/149

(58) Field of Classification Search ................ 340/441, 340/435, 436–440, 932.2, 444; 701/2, 36, 701/41, 301; 303/139; 348/148, 149; 356/28; 180/170, 271
See application file for complete search history.

(56) References Cited

U.S. PATENT DOCUMENTS

| | | | | |
|---|---|---|---|---|
| 4,931,930 A * | 6/1990 | Shyu et al. | ...................... | 701/36 |
| 6,294,986 B1 * | 9/2001 | Landsiedel | ................... | 340/435 |
| 6,476,730 B2 * | 11/2002 | Kakinami et al. | ......... | 340/932.2 |
| 6,483,442 B2 * | 11/2002 | Shimizu et al. | ............ | 340/932.2 |
| 6,611,744 B1 * | 8/2003 | Shimazaki et al. | ............. | 701/41 |
| 6,721,659 B2 * | 4/2004 | Stopczynski | ................. | 701/301 |
| 6,898,495 B2 * | 5/2005 | Tanaka et al. | ................... | 701/36 |
| 6,940,423 B2 * | 9/2005 | Takagi et al. | ............... | 340/932.2 |
| 6,958,770 B2 * | 10/2005 | Okada et al. | .................. | 348/149 |
| 2002/0005779 A1 * | 1/2002 | Ishii et al. | ...................... | 340/436 |
| 2004/0002794 A1 * | 1/2004 | Pillar et al. | ........................ | 701/1 |
| 2005/0033495 A1 * | 2/2005 | Tanaka et al. | ................... | 701/36 |
| 2005/0125155 A1 * | 6/2005 | Kudo | ............................ | 701/301 |
| 2005/0219506 A1 * | 10/2005 | Okuda et al. | .................... | 356/28 |
| 2005/0236894 A1 * | 10/2005 | Lu et al. | ....................... | 303/139 |

(Continued)

FOREIGN PATENT DOCUMENTS

EP 1 470 967 10/2004

(Continued)

*Primary Examiner* — George A Bugg
*Assistant Examiner* — Sisay Yacob
(74) *Attorney, Agent, or Firm* — Harness, Dickey & Pierce, PLC

(57) ABSTRACT

A driving support apparatus has a display mounted in a vehicle, a driving information receiving unit receiving a steering angle of a steering wheel of the vehicle, and a control unit. The control unit produces a vehicle figure imitating a shape of the vehicle and a tire figure imitating a shape of a tire of the vehicle in a bird's-eye view, calculates a predicted running locus of the vehicle, detects positions of portions of an obstacle facing the vehicle one after another, and controls the display to display a driving support image including the vehicle figure, the tire figure, the running locus and obstacle detecting marks indicating the positions of the obstacle while changing a direction of the tire figure with respect to the vehicle figure according to the steering angle. A driver recognizes a turning rate of the vehicle from the direction of the tire figure.

52 Claims, 12 Drawing Sheets

U.S. PATENT DOCUMENTS

2006/0132601 A1* 6/2006 Kukita et al. .................. 348/148
2007/0282489 A1* 12/2007 Boss et al. ........................ 701/2

FOREIGN PATENT DOCUMENTS

| | | |
|---|---|---|
| JP | 61-048098 | 3/1986 |
| JP | 08-050699 | 2/1996 |
| JP | 10-211849 | 8/1998 |
| JP | 2000-187075 | 7/2000 |
| JP | 2000-187799 | 7/2000 |
| JP | 2000-214259 | 8/2000 |
| JP | 2000-238594 | 9/2000 |
| JP | 2000-339595 | 12/2000 |
| JP | 2001-118198 | 4/2001 |
| JP | 2001-283389 | 10/2001 |
| JP | 2001-315602 | 11/2001 |
| JP | 2003-104149 | 4/2003 |
| JP | 2003-114276 | 4/2003 |
| JP | 2003-246248 | 9/2003 |
| JP | 2003-246250 | 9/2003 |
| JP | 2003-246251 | 9/2003 |
| JP | 2003-285705 | 10/2003 |
| JP | 2003-306104 | 10/2003 |
| JP | 2003-312414 | 11/2003 |
| JP | 2004-203359 | 7/2004 |
| JP | 2004-354326 | 12/2004 |
| JP | 2005-178464 | 7/2005 |
| JP | 2005-193698 | 7/2005 |
| JP | 2005-313775 | 11/2005 |
| JP | 2006-015869 | 1/2006 |
| JP | 2006-216066 | 8/2006 |

* cited by examiner

PHASE DIFFERENCE: Δθm=0
(PHASES ARE THE SAME)

PHASE DIFFERENCE: Δθm=90
DEGREES

PHASE DIFFERENCE: Δθm=180
DEGREES (PHASES OPPOSIT
TO EACH OTHER)

RUNNING DIRECTION

RUNNING DIRECTION

ROAD SURFACE

ROAD SURFACE

DRIVING SUPPORT APPARATUS

CROSS-REFERENCE TO RELATED APPLICATION

This application is based upon and claims the benefit of priority of the prior Japanese Patent Application 2006-322134 filed on Nov. 29, 2006 so that the contents of which are incorporated herein by reference.

BACKGROUND OF THE INVENTION

1. Field of the Invention

The present invention relates to a driving support apparatus which is mounted in a vehicle and supports a driver's operation such as a parking operation or the like.

2. Description of Related Art

A driving support apparatus mounted in a vehicle is, for example, disclosed in Published Japanese Patent First Publication No. 2000-339595. In this apparatus, to support an operation of a driver, an image for supporting a driver's operation is displayed on a display. This image includes a rectangular vehicle figure indicating the vehicle, a locus indicating a predicted vehicle running course, and an obstacle detecting mark indicating a position of an obstacle detected near the running course. The vehicle figure is shown to be always directed toward a predetermined direction in the center of the image. A driver can judge based on the image whether or not his or her vehicle is about to collide with an obstacle, so that the driver can easily operate the vehicle so as to avoid a collision with the obstacle.

However, a direction of the vehicle figure is fixed regardless of whether the vehicle is now turned or not. Therefore, the driver can know a turning rate of the vehicle only from the predicted running locus. In this case, even when the vehicle is in a turning state, there is a high probability that the driver viewed only the vehicle figure may momentarily think that the vehicle is now running straight. Therefore, the driver easily misjudges the vehicle to run straight.

Further, in the apparatus disclosed in the Publication, a detecting mark indicates a position of an obstacle relative to a position of a vehicle, and the obstacle is generally at a standstill. When the vehicle is moving, a vehicle figure is always placed in the center of an image of the display, and the relative position of the detecting mark is changed. Therefore, the driver can only recognize based on a change in a relative position of the detecting mark that the vehicle is moving. However, when there are no obstacles along a predicted running locus, no detecting mark is indicated in an image of the display. Therefore, it is difficult for the driver to recognize the movement of the vehicle from an image shown in the display.

Moreover, in the driving support apparatus, the driver can recognize a distance between the vehicle and an obstacle from a distance between a rectangular figure indicating the vehicle and a black circle denoting a detecting mark of the obstacle. The black circle has a certain size or diameter. Therefore, when the vehicle closely approach the obstacle, the driver is difficult to correctly recognize a short distance between the vehicle and the obstacle.

In conclusion, a driver cannot immediately recognize a turning rate of a vehicle, a driver cannot recognize a movement of a vehicle when no obstacles exist near the vehicle, and a driver cannot correctly recognize a distance between a vehicle and an obstacle. Therefore, because the driving support apparatus cannot sufficiently support a driver's operation, a driver cannot easily recognize a movement of a vehicle, so that the driver cannot reliably avoid a collision with an obstacle.

SUMMARY OF THE INVENTION

An object of the present invention is to provide, with due consideration to the drawbacks of the conventional driving support apparatus, a driving support apparatus which sufficiently supports a driver's operation such that the driver easily recognize a movement of a vehicle.

According to a first aspect of this invention, the object is achieved by the provision of a driving support apparatus comprising a display mounted in a vehicle, a driving information receiving unit receiving a steering angle of a steering wheel of the vehicle, and a control unit. The control unit produces a vehicle figure indicating a shape of the vehicle in a top view, produces a tire figure indicating a shape of a tire of the vehicle in the top view, and controls the display to display the vehicle figure and the tire figure while changing a direction of the tire figure with respect to the vehicle figure according to the steering angle.

With this structure of the driving support apparatus, because a direction of the tire figure displayed in the display is changed according to the steering angle, a driver can intuitively realize to what extent a vehicle is turned. Accordingly, the apparatus can sufficiently support a driver's operation, and a driver can visually recognize a turning rate (or turning radius) of a vehicle representing a movement of the vehicle.

Further, the vehicle figure and the tire figure are drawn in a top view such a bird's-eye view, a driver can intuitively realize that the vehicle figure and the tire figure indicate a vehicle and a tire. Accordingly, the driver can rapidly realize that a direction of the tire figure indicates a turning rate (or turning radius) of a vehicle.

Preferably, the apparatus further comprises an object detecting unit intermittently detecting a position of a portion of an object relative to a position of the vehicle moved with a time while changing the portion of the object with the time. The driving information receiving unit receives a running speed of the vehicle. The control unit determines a plurality of marking positions of the display corresponding to the positions of the portions of the object on the basis of the running speed and the steering angle of the vehicle, and controls the display to draw a plurality of detecting marks at the respective marking positions.

With this structure of the apparatus, when the vehicle is moved, the object detecting unit intermittently detects a position of a portion of an object relative to a position of the vehicle while changing the portion of the object with the time. Therefore, a plurality of detecting marks drawn in the display indicate an outline of the object. Accordingly, a driver can easily recognize a type of the object from the outline of the object, so that the driver can safely drive the vehicle.

Further preferably, the control unit produces an enlarged vehicle outline figure, determined by enlarging an outline of the vehicle figure, or a portion of the enlarged vehicle outline figure, and controls the display to display the enlarged vehicle outline figure or the portion of the enlarged vehicle outline figure such that a center of the enlarged vehicle outline figure accords with a center of the vehicle figure.

With this structure of the control unit, the enlarged vehicle outline figure or the portion of the enlarged vehicle outline figure is displayed so as to surround the vehicle figure. Therefore, when a driver moves a vehicle such that the enlarged vehicle outline figure or the portion of the enlarged vehicle outline figure does not intersect with the detecting marks indicating an object, the driver can further safely drive the vehicle.

According to a second aspect of this invention, the object is achieved by the provision of a driving support apparatus comprising a display mounted in a vehicle, a driving information receiving unit receiving a steering angle of a steering wheel of the vehicle and a running speed of the vehicle, and a control unit. The control unit produces a vehicle figure indicating a shape of the vehicle in a top view, produces a repetitive figure having a plurality of predetermined figures aligned along each of first and second directions perpendicular to each other, and controls the display to display the vehicle figure and the repetitive figure such that the repetitive figure is moved relative to the vehicle figure on the basis of the steering angle and the running speed of the vehicle.

With this structure of the driving support apparatus, the repetitive figure displayed with the vehicle figure is moved relative to the vehicle figure on the basis of the steering angle and the running speed of the vehicle. Because the repetitive figure has a plurality of predetermined figures aligned along each of first and second directions perpendicular to each other, the predetermined figures regularly aligned are moved on the vehicle figure on the basis of the steering angle and the running speed.

Accordingly, the apparatus can sufficiently support a driver's operation, and a driver viewing the movement of the repetitive figure can easily recognize a movement of a vehicle.

According to a third aspect of this invention, the object is achieved by the provision of a driving support apparatus comprising a display mounted in a vehicle, a driving information receiving unit receiving a steering angle of a steering wheel of the vehicle and a running speed of the vehicle, an object detecting unit detecting a position of an object, and a control unit. The control unit produces a vehicle figure indicating a whole shape of the vehicle in a top view, determines a portion of the vehicle nearest to the object on the basis of the position of the object detected by the object detecting unit, produces an enlarged vehicle portion figure indicating an enlarged shape of the portion of the vehicle, controls the display to display a wider-area image including the vehicle figure and an enlarged image including the enlarged vehicle portion figure, determines a marking position of each of the wider-area image and the enlarged image corresponding to the position of the object detected by the object detecting unit on the basis of the running speed and the steering angle of the vehicle received by the driving information receiving unit, determines a locus position of a running locus of the vehicle in each of the wider-area image and the enlarged image according to the steering angle and the running speed of the vehicle, controls the display to draw a first detecting mark placed at the marking position and the running locus placed at the locus position in the wider-area image, and controls the display to draw a second detecting mark placed at the marking position and the running locus placed at the locus position in the enlarged image, the second detecting mark having a size larger than a size of the first detecting mark.

With this structure of the driving support apparatus, an enlarged vehicle portion figure indicating an enlarged shape of a portion of the vehicle is displayed with a detecting mark of the object and a running locus of the vehicle in an enlarged image. Therefore, a driver viewing the enlarged image can recognize with high precision whether or not the vehicle is about to collide with the object. Further, a vehicle figure indicating a whole shape of the vehicle is displayed with a detecting mark of the object and a running locus of the vehicle in a wider-area image. Therefore, because a driver viewing the wider-area image knows an actual size of the vehicle, the driver can rapidly recognize a distance between the vehicle and the object by comparing a distance between the vehicle figure and the detecting mark with a size of the vehicle figure.

Accordingly, the driver can precisely presume a collision of the vehicle with the obstacle while easily recognizing a distance between the vehicle and the object.

DETAILED DESCRIPTION OF THE PREFERRED EMBODIMENTS

Figure 1:
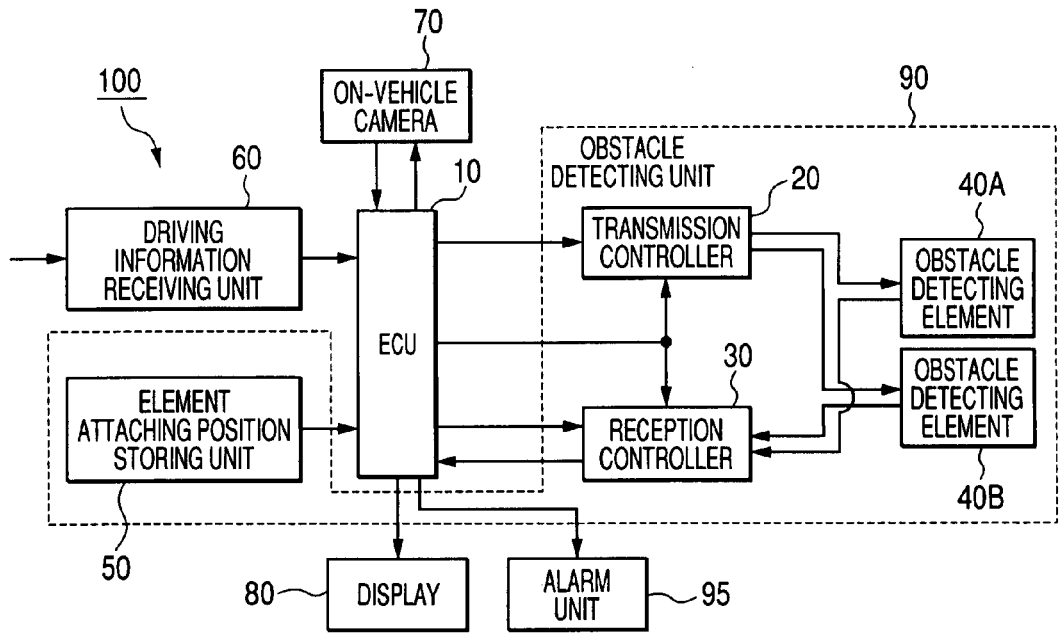
FIG. 1 is a block diagram of a driving support apparatus according to embodiments of the present invention.

Embodiments of the present invention will now be described with reference to the accompanying drawings, in which like reference numerals indicate like parts, members or elements throughout the specification unless otherwise indicated.

Embodiment 1

FIG. 1 is a block diagram of a driving support apparatus according to the first embodiment. A driving support apparatus is, for example, mounted on a present vehicle.

As shown in FIG. 1, a driving support apparatus 100 has a display 80, a driving information receiving unit 60 for receiving driving information from sensors of the vehicle, and an electronic control unit (ECU) 10 for producing a driving support image in accordance with the driving information received from the unit 60 and controlling the display 80 to display the image.

The unit 60 receives driving information such as a running speed of the vehicle, a steering angle of a tire, a running direction of the vehicle and the like from various devices and sensors (not shown) mounted on the vehicle every predetermined period of time. The running speed is received from a running speed sensor serving as a moving speed detecting device. The steering angle is received from a steering angle sensor detecting an operation angle of a steering wheel. The running direction is received from a shift position sensor serving as a moving direction detecting device.

Although elements of the ECU 10 are not shown in FIG. 1, the ECU 10 is formed of a computer with a read only memory (ROM), a random access memory (RAM), a central processing unit (CPU), an input/output interface (I/O) and bus lines connecting ROM, RAM, CPU and I/O with one another. The RAM stores in advance data indicating an external shape (or contours) of the present vehicle and an outline of a tire (or wheel) of the vehicle.

The ECU 10 executes programs stored in advance in the ROM on the basis of the data stored in the RAM to produce a vehicle figure indicating an external shape of the vehicle and a tire figure indicating a tire of the vehicle in a top view such as a bird's-eye view. Further, the ECU 10 controls the display 80 to display the tire figure and the vehicle figure and changes a direction or angle of the tire figure with respect to the vehicle figure according to the steering angle received in the unit 60. Therefore, the direction or angle of the tire figure becomes the same as a turning direction or angle of a front tire (or front wheel) of the vehicle with respect to the vehicle.

Moreover, the ECU 10 produces a predicted running locus of the vehicle according to the steering angle and the running speed received in the unit 60 and draws the predicted running locus in the image shown on the display 80.

The driving support apparatus 100 may further has an obstacle detecting unit 90 for searching a side area of the vehicle for an obstacle (or object) existing around the vehicle and detecting a position of the obstacle every predetermined period of time when the obstacle exists near the vehicle, an alarm unit 95 for outputting an alarm under control of the ECU 10 when the ECU 10 predicts a collision of the vehicle with the obstacle detected by the unit 90, and an on-vehicle camera 70 for photographing surroundings of the vehicle under control of the ECU 10 to display the surroundings on the display 80.

The obstacle detecting unit 90 has a transmission controller 20 for producing transmission waveforms, a plurality of obstacle detecting elements 40 (e.g., a set of two elements 40A and 40B disposed on a horizontal plane in this embodiment) each of which produces a transmission signal with the corresponding transmission waveform, an element attaching position storing unit 50 for storing positions of the elements 40 attached on a body of the vehicle, and a reception controller 30.

Each of the elements 40 outputs the transmission signal every predetermined period of time and receives a reception signal obtained by reflecting the transmission signal on a portion of an obstacle. The portion of the obstacle faces the vehicle at the nearest distance between the obstacle and the elements 40. Therefore, the portion of the obstacle is changed with the movement of the vehicle. The reception controller 30 calculates a position of the portion of the obstacle from the reception signals received in the elements 40. The position of the portion of the obstacle fixedly disposed is changed with the movement of the vehicle.

The ECU 10 stores the changeable position of the obstacle detected by the unit 90 every predetermined period of time, and controls the display 80 to display a plurality of obstacle detecting marks in the image for the purpose of supporting a driver's operation. The detecting marks indicate the respective positions of portions of the obstacle. Further, the ECU 10 determines the position of the obstacle in movable two-dimensional coordinates. These coordinates are defined on the horizontal plane of the elements 40 and have an original point set at a center position of the vehicle. The ECU 10 judges whether or not an outline of the object obtained by connecting the detecting marks one after another intersects with the predicted running locus, and controls the alarm unit 95 to output an alarm when the outline of the object intersects with the predicted running locus.

The transmission controller 20 controls each of the elements 40 to output a transmission signal. More specifically, the controller 20 produces a first sine waveform and a second sine waveform in response to a transmission instruction of the ECU 10 and outputs the sine waveforms to the respective elements 40A and 40B every predetermined period of time. Each sine waveform has a constant wavelength λ.

Figure 2:
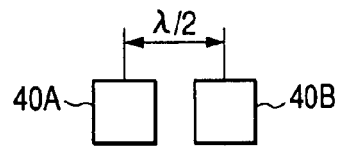
FIG. 2 shows a positional relation between obstacle detecting elements of the apparatus shown in FIG. 1.

FIG. 2 shows a positional relation between the elements 40. The elements 40A and 40B are aligned on a horizontal plane above a road along a longitudinal direction extending from a front side to a rear side of the vehicle. The elements 40 are away from each other by a half length λ/2 of the wavelength of the transmission signal. The elements 40 are disposed near a position placed just above a front wheel of the vehicle on a side surface of the vehicle. Each element 40 produces a transmission signal with the sine waveform set in the controller 20. The elements 40 intermittently output the transmission signals at a predetermined composite directivity. The center of the transmission signals is directed toward a side direction almost perpendicular to the longitudinal direction of the vehicle on the horizontal plane. Each element 40 is formed of an ultrasonic microphone for generating a signal of ultrasonic waves, an antenna for generating a signal of electromagnetic waves, or the like.

The storing unit 50 stores information of positions of the elements 40A and 40B. The unit 50 further stores information of attaching postures of the elements 40. The positions and attaching postures of the elements 40 are defined in three-dimensional coordinates having an original point set at a center position of the vehicle.

Figure 3:
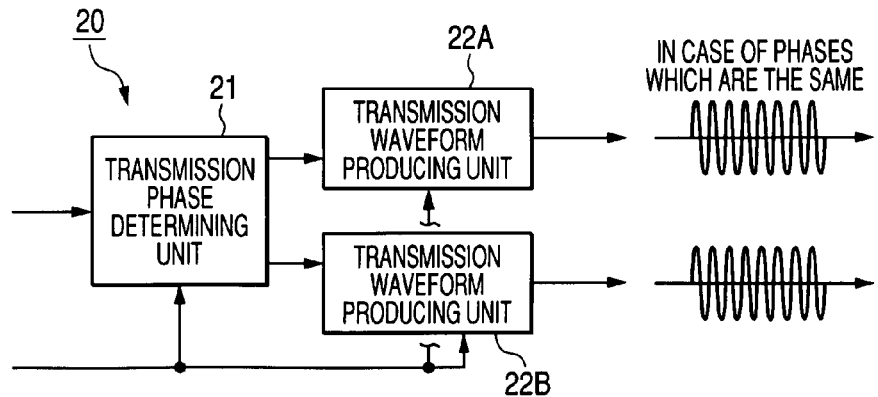
FIG. 3 is a block diagram of a transmission controller of the apparatus shown in FIG. 1.

FIG. 3 is a block diagram of the transmission controller 20. As shown in FIG. 3, the controller 20 has a transmission phase determining unit 21 and two transmission waveform producing units 22 (22A and 22B). The determining unit 21 determines a phase of each transmission signal in response to an instruction of the ECU 10. Each producing unit 22 produces a sine waveform set at the determined phase as a transmission waveform and outputs the transmission waveform to the corresponding element 40.

More specifically, the determining unit 21 determines phases of the transmission signals every predetermined period of time so as to alternately set a composite directivity of the transmission signals at a narrow angle directivity and a wide angle directivity. To alternately select a narrow angle directivity and a wide angle directivity, the determining unit 21 determines both a first phase and a second phase. The first phase is fixed and is not changed with time. The second phase is changeable so as to be changed every predetermined period of time. The producing unit 22A produces a sine waveform with the first phase, and the producing unit 22B produces a sine waveform with the second phase. For example, the phase of the sine waveform in the producing unit 22A is always set at 0 degree, and the sine waveform in the producing unit 22B is alternately set at a phase of 0 degree and a phase of 180 degrees.

Figure 4:
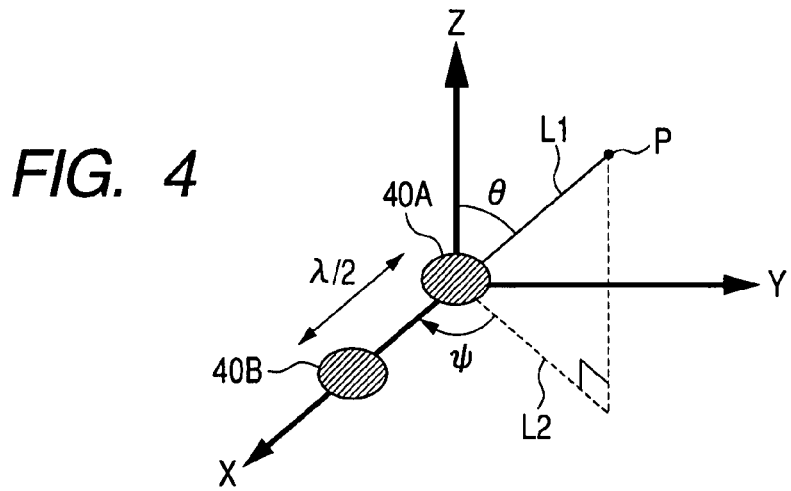
FIG. 4 shows a position of an arbitrary point in a three-dimensional coordinates system.

The composite directivity of the transmission signals is now described in detail with reference to FIG. 4. FIG. 4 shows a position of an arbitrary point P in a three-dimensional coordinates system defined by three reference axes.

As shown in FIG. 4, the coordinates system has a reference axis X, a reference axis Y and a reference axis Z perpendicular to one another. For example, the axis X extends along the longitudinal direction of the vehicle, the axis Y extends along an upper direction, and the axis Z extends along a lateral direction of the vehicle. The element 40A is placed on the original point, and the element 40B is placed on the axis X to be away from the element 40A by a half wavelength λ. That is, the elements 40 are placed on a horizontal plane defined by the axes X and Z. A line L1 connecting the original point and the point P makes an angle of θ with the axis Z, and a line L2 connecting the original point and a projected point of the arbitrary point P on a plane defined by the axes X and Y makes an angle of ψ with the axis x. A composite directivity E(θ, ψ) of the transmission signals, being changed with a direction defined by the angles θ and ψ, is expressed according to a formula (1).

$$E(\theta, \varphi) = E_0(\theta, \varphi) \times \sum_{m=0}^{M-1} \exp[j\{2\pi/\lambda) \times (m \times dx \times \sin\theta \times \cos\varphi) + \theta_m\}]$$

wherein $E_0$ (θ, ψ) denotes a directivity of each transmission signal and is changed with a direction defined by the angles θ and ψ, the symbol M denotes the number of elements 40, the symbol m denotes the number of each element 40, the symbol j denotes an imaginary expression, the symbol dx denotes a distance between the elements 40, and the symbol θm denotes a phase of the transmission signal outputted from the m-th element 40.

To simplify the composite directivity changed with a direction defined by the angles θ and ψ, a simplified composite directivity is considered by setting ψ=0 in the composite directivity. The simplified composite directivity is changed with a direction defined only by the angle θ on a plane (i.e., horizontal pane of the elements 40) defined by the axes X and Z. In the simplified composite directivity, M=2 and dx=λ/2 are set. In this case, a simplified composite directivity E (θ, ψ) is expressed according to a formula (2).

$$E(\theta,0)=E_0(\theta,0)\times[1+\exp\{j(\pi\times\sin\theta+\Delta\theta_m)\}]$$

wherein a difference between the phases $\theta_0$ and $\theta_1$ of the transmission signals of the elements 40A and 40B is expressed by $\Delta\theta m=\theta_1-\theta_0$. Because the phase of the sine waveform in the producing unit 22A is always set at 0 degree, $\theta_0=0$ is satisfied. Therefore, $\Delta\theta m=\theta_1$ is satisfied.

It is realized from the simplified composite directivity E (θ, 0) that the composite directivity is set at the most narrow-angle directivity when Δθm=0 is set so as to set the transmission signals at the same phase. In contrast, it is realized from the simplified composite directivity E (θ,0) that the composite directivity is set at the most wide-angle directivity when Δθm=180 degrees is set so as to set the transmission signals at the phases opposite to each other.

Figure 5A:
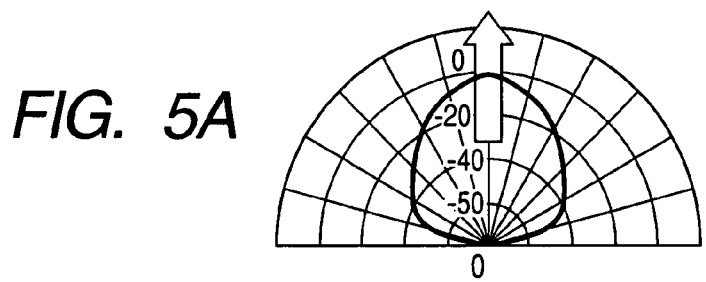
FIG. 5A shows a simplified composite directivity in case of a phase difference $\Delta\theta m = 0$.
Figure 5B:
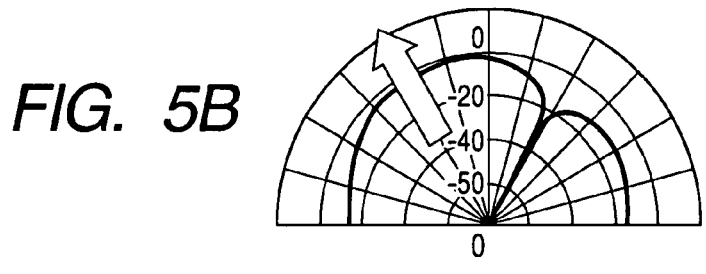
FIG. 5B shows a simplified composite directivity in case of a phase difference $\Delta\theta m = 90$ degrees.
Figure 5C:
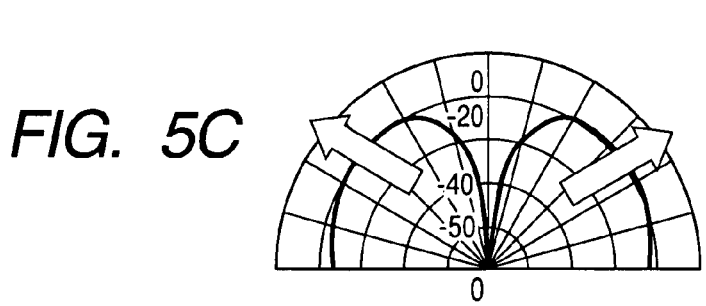
FIG. 5C shows a simplified composite directivity in case of a phase difference $\Delta\theta m = 180$ degrees.

FIG. 5A exemplarily shows the simplified composite directivity E (θ, 0) in case of Δθm=0 (same phase), FIG. 5B exemplarily shows the simplified composite directivity E(θ, ψ) in case of Δθm=90 degrees, and FIG. 5C exemplarily shows the simplified composite directivity E (θ, 0) in case of Δθm=180 degrees (phases opposite to each other). As is realized from the simplified composite directivity E (θ, 0) shown in FIG. 5A, FIG. 5B and FIG. 5C, when a phase difference between the transmission signals outputted from the elements 40A and 40B is changed, the composite directivity E(θ, ψ) expressed in the formula (1) is changed. When the phase difference is set at zero, the composite directivity E (θ, ψ) set at a narrow-angle directivity is obtained. When the phase difference is set at 180 degrees, the composite directivity E(θ, ψ) set at a wide-angle directivity is obtained.

Figure 6:
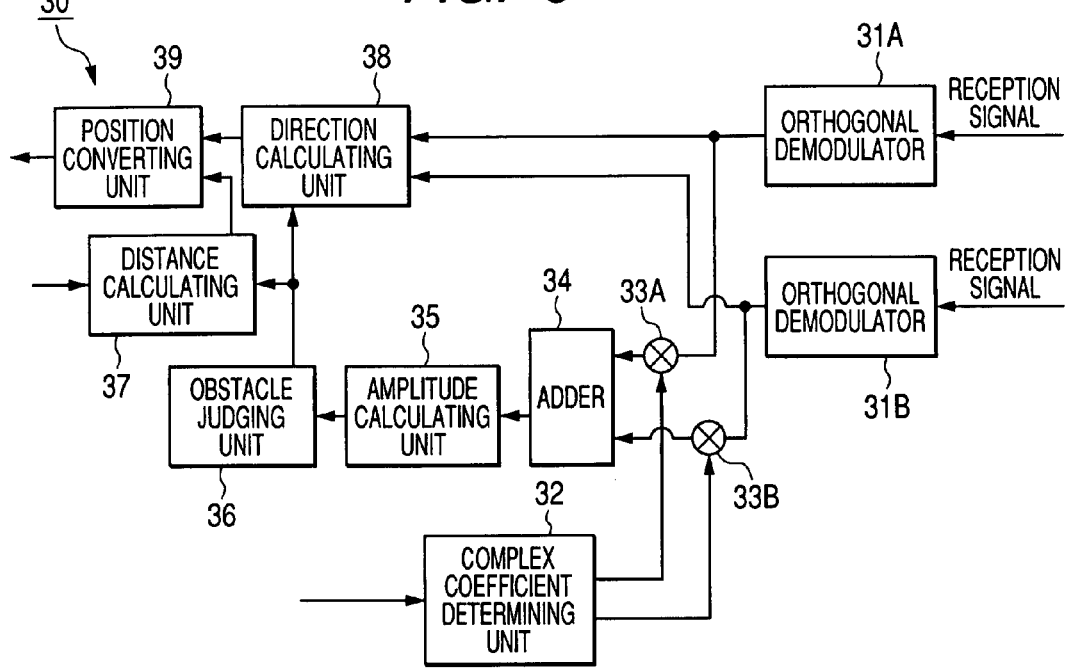
FIG. 6 is a block diagram of a reception controller of the apparatus shown in FIG. 1.

FIG. 6 is a block diagram of the reception controller 30. As shown in FIG. 6, the controller 30 has orthogonal demodulators 31 (31A and 31B) for respectively performing orthogonal demodulation for reception signals, being successively received in the respective elements 40A and 40B, to obtain orthogonal demodulation signals, a complex coefficient determining unit 32, a multiplier 33A for multiplying the demodulation signal of the demodulator 31A by a first complex coefficient of the unit 32, a multiplier 33B for multiplying the demodulation signal of the demodulator 31B by a second complex coefficient of the unit 32, and an adder 34 for vector-adding a multiplied signal of the multiplier 33A and a multiplied signal of the multiplier 33B to each other to have a composite vector of a composite signal.

Each demodulator 31 multiplies a reception signal received in the corresponding element 40 by each of a sine wave and a cosine wave set at a predetermined frequency together to extract an in-phase (I) component and a quadrature (Q) component, removes high-frequency components (i.e., noises) from each of the in-phase and quadrature components in a low pass filter, and converts analog values of each of the filtered components into digital values. Therefore, the demodulator 31A produces an orthogonal demodulation signal Rx-A having in-phase and quadrature components, and the demodulator 31B produces an orthogonal demodulation signal Rx-B having in-phase and quadrature components. Each demodulator 31 may remove high-frequency components after the analog-to-digital conversion.

The complex coefficient determining unit 32 determines complex coefficients to multiply each of the orthogonal demodulation signals of the demodulators 31 by the corresponding complex coefficient. As described later in detail, a reception directivity for the reception signals depends on a combination of the complex coefficients. In this embodiment, the complex coefficients are determined such that a composite directivity for the reception signals becomes the same as the composite directivity $E(\theta, \psi)$ for the transmission signals expressed in the formula (1). Because the transmission controller 20 alternately set the composite directivity $E(\theta, \psi)$ for the transmission signals at a narrow angle directivity and a wide angle directivity, the determining unit 32 determines complex coefficients such that a narrow angle directivity and a wide angle directivity is alternately set in the composite directivity for the reception signals.

Figure 7A:
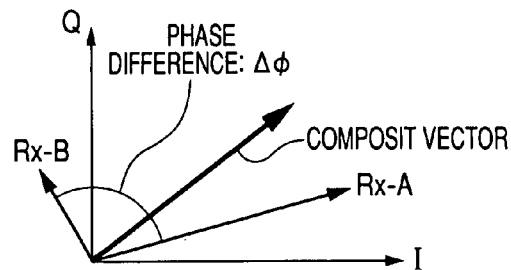
FIG. 7A shows vectors of orthogonal demodulation signals Rx-A and Rx-B obtained in demodulators of the controller shown in FIG. 6 and a composite vector of the vectors on a complex plane.
Figure 7B:
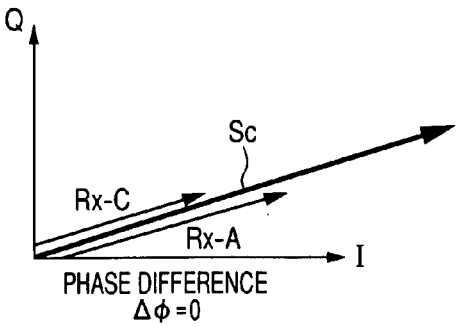
FIG. 7B shows the vector Rx-A, a vector Rx-C obtained by phase-changing the vector Rx-B, and a composite vector of the vectors Rx-A and Rx-C on a complex plane.
Figure 8:
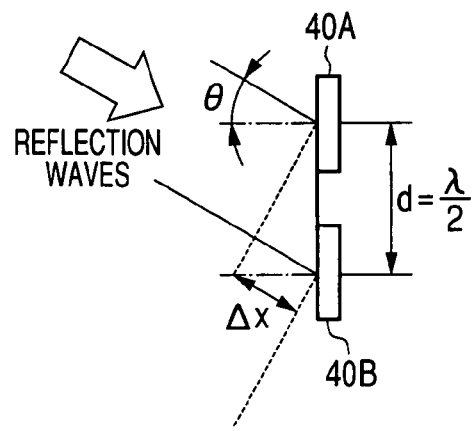
FIG. 8 shows a reflection wave incoming to elements disposed away from each other at an incoming angle $\theta$ and at a path difference $\Delta x$.

The reason that a reception directivity for the reception signals is changed with a combination of the complex coefficients is now described. FIG. 7A shows a vector of an orthogonal demodulation signal Rx-A obtained in the demodulator 31A, a vector of an orthogonal demodulation signal Rx-B obtained in the demodulator 31B and a composite vector of the signals Rx-A and Rx-B on a complex plane. FIG. 7B shows the vector of the signal Rx-A, a vector of a signal Rx-C obtained by multiplying the signal Rx-B by a complex coefficient so as to have the same phase as the signal Rx-A, and a composite vector of a composite signal Sc obtained by combining the signals Rx-A and Rx-C on the complex plane. This complex plane is defined by an I axis indicating a value of an in-phase component and a Q axis indicating a value of a quadrature component. FIG. 8 shows a reflection wave incoming to elements 40 disposed away from each other by a distance $D=\lambda/2$. The reflection wave is incident on the elements 40 at an incoming angle $\theta$ and at a path difference $\Delta x$.

As shown in FIG. 7A, the signals Rx-A and Rx-B of the demodulators 31A and 31B have a phase difference $\Delta\phi$ such that the signal Rx-B is advanced. This phase difference $\Delta\phi$ is caused due to a path difference in a reflection wave coming to the elements 40A and 40B. As shown in FIG. 8, when a wave reflected on an obstacle is returned to the elements 40 at an angle $\theta$ between an incoming direction of the reflection wave and a direction perpendicular to an aligning direction of the elements 40, the reflection wave is received in the elements 40 at a path difference $\Delta x=(\lambda/2)\sin\theta$. The value $\lambda/2$ denotes a distance D between the elements 40A and 40B. Therefore, phases of the reception signals at the elements 40 are differentiated from each other.

When the signal Rx-B is multiplied by a complex coefficient set at $\exp(-j\Delta\phi)$ to have a signal Rx-C, as shown in FIG. 7B, a vector of the signal Rx-C becomes parallel to the vector of the signal Rx-A. That is, phases of the signals Rx-A and Rx-C are the same. A length of a composite vector of a composite signal Sc obtained by combining the signals Rx-A and Rx-C shown in FIG. 7B becomes larger than a length of a composite vector of the signals Rx-A and Rx-B shown in FIG. 7A.

Therefore, when at least one of the orthogonal demodulation signals of the elements 40A and 40B is multiplied by one complex coefficient corresponding to a phase difference between the orthogonal demodulation signals of the demodulators 31, a length of a composite vector (i.e., composite amplitude) of the orthogonal demodulation signals can be enlarged. In other words, when one orthogonal demodulation signal is multiplied by a complex coefficient not corresponding to the phase difference, a length of a composite vector of the orthogonal demodulation signals cannot be enlarged so much.

Further, as shown in FIG. 8, when a reflection wave is incident on the elements 40A and 40B at the angle $\theta$ equal to zero, the phase difference $\Delta\theta$ becomes equal to zero. As the angle $\theta$ is increased, the phase difference $\Delta\psi$ becomes large. Therefore, when it is desired to enlarge a composite directivity for the reception signals coming to the elements 40A and 40B at an angle $\theta=0$ corresponding to a phase difference $\Delta\phi=0$, a complex coefficient equal to 1 (i.e., $\exp(-j\times 0)$ corresponding to the phase difference $\Delta\phi=0$ is used. In contrast, it is desired to enlarge a composite directivity for the reception signals coming to the elements 40A and 40B at an angle $\theta$ corresponding to a phase difference $\Delta\phi=\pi$, a complex coefficient equal to $\exp(-j\pi)$ corresponding to the phase difference $\Delta\phi=\pi$ is used in one of the multipliers 33.

Returning to FIG. 6, the reception controller 30 further has an amplitude calculating unit 35, an obstacle judging unit 36, a distance calculating unit 37, a direction (or azimuth) calculating unit 38, and a position converting unit 39.

Figure 9A:
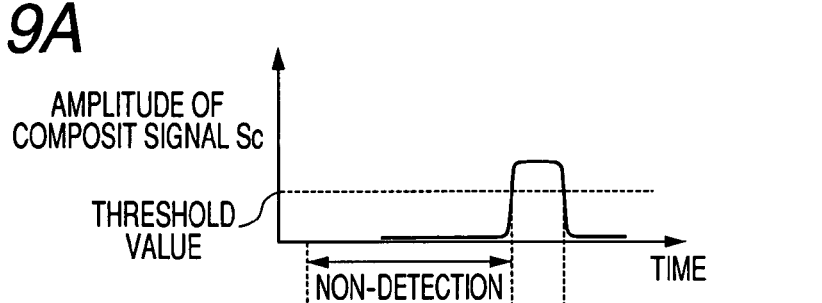
FIG. 9A shows a change in an amplitude of a composite signal (i.e., composite vector shown in FIG. 7B) with respect to time.

The amplitude calculating unit 35 calculates an amplitude of the composite signal obtained in the adder 34. This amplitude denotes a length of the composite vector shown in FIG. 7B. FIG. 9A is a view showing a change in the amplitude of the composite signal Sc calculated in the unit 35. As shown in FIG. 9A, the amplitude is lower than a threshold value during a non-detection period of time from a transmission time T0 of the transmission signals to a detection start time T1. In contrast, the amplitude becomes larger than the threshold value during a detection period of time from the detection start time T1 to a detection finish time T2.

The obstacle judging unit 36 judges whether or not the amplitude calculated in the unit 35 is larger than the threshold value. When the amplitude exceeds the threshold value during a detection period of time between a detection start time T1 and a detection finish time T2, the unit 36 judges that the reception signals received in the elements 40 during the detection period of time are reflection waves returned from an obstacle in response to the transmission signal transmitted from the elements 40. Then, the unit 36 sends the transmission time T0, the detection start time T1 and the detection finish time T2 to the units 37 and 38 along with an obstacle detection signal.

The distance calculating unit 37 receives the obstacle detection signal, the transmission time T0 and the detection start time T1 from the ECU 10 and calculates a time difference between the transmission time T0 and the detection start time T1 in response to the obstacle detection signal. The unit 37 stores in advance a propagation speed of the transmission and reception signals and calculates a distance between the driving support apparatus 100 and an obstacle from the time difference and the propagation speed.

Figure 9B:
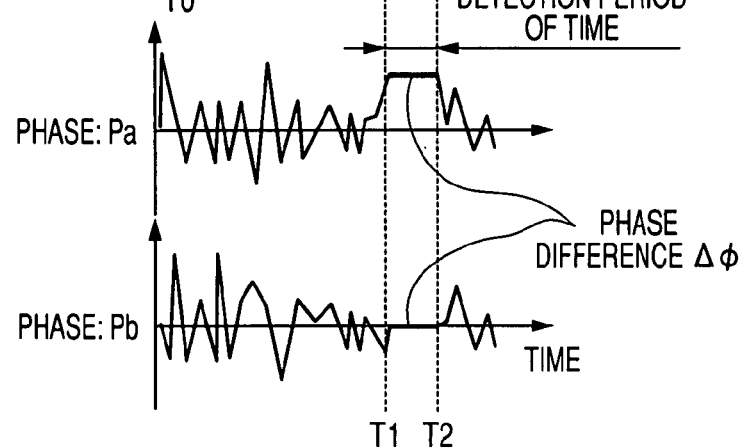
FIG. 9B shows a change of a phase Pa of the vector Rx-A and a change of a phase Pb of the vector Rx-B with respect to time.

The direction calculating unit 38 receives the orthogonal demodulation signals from the demodulating units 31 in response to the obstacle detection signal and calculates an incoming direction of the reflection waves (i.e., a direction in which the obstacle exists) from the orthogonal demodulation signals. FIG. 9B shows a change of a phase Pa of the demodulation signal of the demodulator 31A and a change of a phase Pb of the demodulation signal of the demodulator 31B with respect to time. During the non-detection period of time, each of the demodulators 31 receives a noise signal having a randomly-changed phase as a reception signal. Therefore, as shown in FIG. 9B, each of the phases of the demodulation signals considerably changes with time during the non-detection period of time. In contrast, during the detection period of time, each of the demodulators 31 receives a reflection wave from a stationary object as a reception signal. Therefore, as shown in FIG. 9B, each of the phases almost becomes constant during the detection period of time.

The unit 38 calculates a phase difference $\Delta\phi$ between a constant phase Pa of the demodulation signal of the demodulator 31A and a constant phase Pb of the demodulation signal of the demodulator 31B during the detection period of time and calculates a direction $\theta$ to the obstacle (i.e., a coming direction of the reflection wave) from the phase difference $\Delta\phi$ according to a formula (3)

$$\theta = \sin^{-1}(\Delta\phi \times \lambda/(2\pi \times D)) \quad (3)$$

wherein the symbol $\lambda$ denotes a wavelength of the reflection wave substantially equal to a wavelength of the transmission signals and the symbol D denotes a distance between the elements 40.

Figure 10:
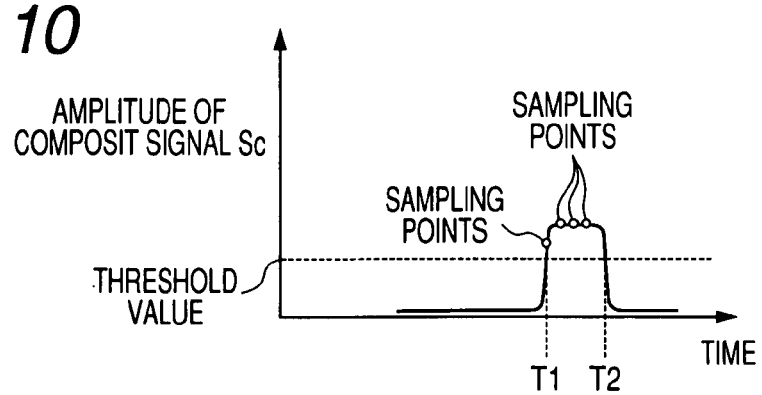
FIG. 10 shows a plurality of sampling points of a composite signal (i.e., composite vector shown in FIG. 7B) determined during a detection period of time.
Figure 11A:
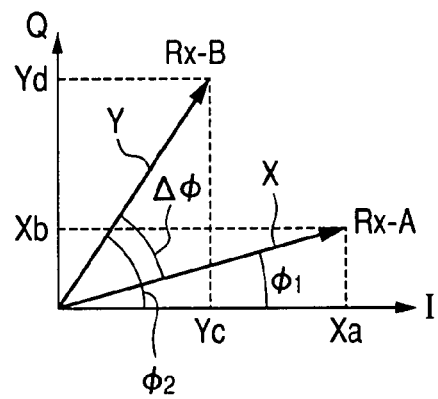
FIG. 11A shows vectors of the demodulation signals Rx-A and Rx-B at each of the sampling times on the complex plane.
Figure 11B:
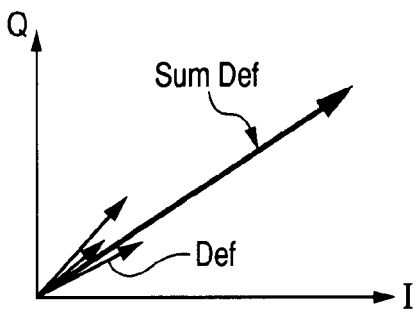
FIG. 11B shows a sum of a plurality of phase difference vectors Def each of which is determined from the demodulation signals Rx-A and Rx-B at one of the sampling times.

The calculation of the phase difference $\Delta\phi$ is described with reference to FIG. 10, FIG. 11A and FIG. 11B. FIG. 10 shows a plurality of sampling points of the composite signal at respective sampling times during the detection period of time. FIG. 11A shows vectors of the demodulation signals Rx-A and Rx-B at each of the sampling times on the complex plane. FIG. 11B shows a sum of a plurality of phase difference vectors Def each of which is determined from the demodulation signals Rx-A and Rx-B at one of the sampling times.

As shown in FIG. 10, the unit 38 determines a plurality of sampling points of the amplitude of the composite signal at respective sampling times during the detection period of time. Then, the unit 38 calculates a phase difference vector Def from the demodulation signals Rx-A and Rx-B at each of the sampling times according to a formula (4)

$$Def = X \times Y \times \exp(j(\phi 1 - \phi 2)) \quad (4)$$
$$= XY \exp(j\phi 1 - j\phi 2)$$

wherein X denotes an amplitude of the demodulation signal Rx-A, Y denotes an amplitude of the demodulation signal Rx-B, $\phi 1$ denotes a phase of the demodulation signal Rx-A, and $\phi 2$ denotes a phase of the demodulation signal Rx-B (see FIG. 11A).

The value $\exp(j\phi 1)$ is replaced with a unit vector a+jb, and the value $\exp(j\phi 2)$ is replaced with a unit vector c+jd. The formula (4) is changed as follows.

$$Def = XY \exp(j\phi 1 - j\phi 2)$$
$$= XY\{\exp(j\phi 1) \times \exp(-j\phi 2)\}$$
$$= XY\{(a + jb) + (c - jd)\}$$
$$= XY\{(ac + bd) + j(bc - ad)\}$$
$$= (Xa)(Yc) + (Xb)(Yd) + j\{(Xb)(Yc) - (Xa)(Yd)\}$$

An in-phase component Def-I and a quadrature component Def-Q of the phase difference vector Def are expressed according to formulas (5) and (6).

$$Def\text{-}I = (Xa)(Yc) + (Xb)(Yd) \quad (5)$$

$$Def\text{-}Q = (Xb)(Yc) - (Xa)(Yd) \quad (6)$$

The values Xa, Xb, Yc, and Yd are rewritten to Xa=Rx-A–I(t), Xb=Rx-A–Q(t), Yc=Rx-B–I(t), and Yd=Rx-B–Q(t). As realized with reference to FIG. 11A, the value Xa=Rx-A–I(t) denotes an in-phase component of the demodulation signal Rx-A at a sampling time t, and the value Xb=Rx-A–Q(t) denotes a quadrature component of the demodulation signal Rx-A at a sampling time t. The value Yc=Rx-B–I(t) denotes an in-phase component of the demodulation signal Rx-B at a sampling time t, and the value Yd=Rx-B–Q(t) denotes a quadrature component of the demodulation signal Rx-B at a sampling time t.

Therefore, the formula (5) can be rewritten to a formula (7), and the formula (6) can be rewritten to a formula (8).

$$Def\text{-}I = Rx\text{-}A\text{-}I(t) \times Rx\text{-}B\text{-}I(t) + Rx\text{-}A\text{-}Q(t) \times Rx\text{-}B\text{-}Q(t) \quad (7)$$

$$Def\text{-}Q = Rx\text{-}A\text{-}Q(t) \times Rx\text{-}B\text{-}I(t) - Rx\text{-}A\text{-}I(t) \times RX\text{-}B\text{-}Q(t) \quad (8)$$

The unit 38 calculates a sum of the vectors Def at the sampling times from the in-phase and quadrature components Def-I and Def-Q of the vectors Def expressed in the formulas (7) and (8) to obtain a composite phase difference vector Sum-Def (see FIG. 11B). Because a phase of the vector Sum-Def indicates an average of phases of the vectors Def, the unit 38 substitutes the phase of the vector Sum-Def for the phase difference $\Delta\phi$ in the formula (3). Then, the unit 38 calculates an incoming direction $\theta$ of the reflection waves (i.e., a direction in which the obstacle exists) according to the formula (3).

The position converting unit 39 determines coordinate information indicating a position of the obstacle from the distance to the obstacle calculated in the unit 37 and the direction $\theta$ to the obstacle calculated in the unit 38. In this embodiment, the elements 40 are placed on a horizontal plane, so that the unit 39 determines the position of the obstacle in two-dimensional coordinates including the horizontal plane. An original point of the two-dimensional coordinates is placed in the center of the vehicle. The unit 39 transmits the coordinate information of the obstacle to the ECU 10 in response to a position information requesting instruction received from the ECU 10.

Next, an operation of the ECU 10 is now described in detail according to this embodiment.

The ECU 10 outputs a transmission instruction to the transmission controller 20 every predetermined period of time. In response to each of these instructions, the controller 20 transmits two transmission waveforms to the respective elements 40 such that a composite directivity of two transmission signals with the respective transmission waveforms is alternately set at a narrow angle directivity and a wide angle directivity every predetermined period of time. The elements 40 outputs the transmission signals every predetermined period of time. When the elements 40 receive reflected waves reflected on an obstacle as reception signals, the reception controller 30 processes the reception signals and calculates a position of the obstacle, and the ECU 10 receives the position of the obstacle every predetermined period of time.

Then, the ECU 10 converts each position of the obstacle received from the controller 30 into a position in two-dimensional coordinates which are defined on a horizontal plane of the elements 40 and have an original point set at the center point of the vehicle. When the vehicle is moved, the two-dimensional coordinates are moved with time. The ECU 10 stores the converted position of the obstacle in association with time into the RAM. When the driving support apparatus 100 has other elements for receiving reception signals, the ECU 10 also determines a position of the obstacle on the same two-dimensional coordinates. Therefore, when the apparatus 100 has a plurality of sets of elements for receiving reception signals, the ECU 10 can precisely determine a position of the obstacle on the two-dimensional coordinates from reception signals received in the sets of elements.

Thereafter, the ECU 10 determines a center position of the vehicle placed at the detection start time T1 as a fixed reference point to define a fixed two-dimensional coordinates system having an original point at the fixed reference point on the horizontal plane of the elements 40, and the ECU 10 calculates a locus of a center position of the vehicle moved with time on the fixed two-dimensional coordinates. This locus is calculated based on a running speed and a steering angle of the vehicle received in the unit 60 and is stored in a RAM of the ECU 10 in association with time. Therefore, the center position of the vehicle at any time can be determined from this calculated locus on the fixed two-dimensional coordinates. Then, the ECU 10 converts each of the stored positions of the obstacle associated with time and defined on the movable two-dimensional coordinates into a position on the fixed two-dimensional coordinates on the basis of the stored locus of the center position of the vehicle. In this case, because the obstacle has a certain size, a portion of the obstacle reflecting the transmission signals to the elements 40 is changed with time. Therefore, the position of the obstacle defined on the fixed two-dimensional coordinates is changed with time, so that a plurality of obstacle detecting marks indicating the positions of the portions of the obstacle are shown along an outline of the obstacle on the display 80. Therefore, a driver can visually recognize a shape of the obstacle from a series of obstacle detecting marks.

Figure 12A:
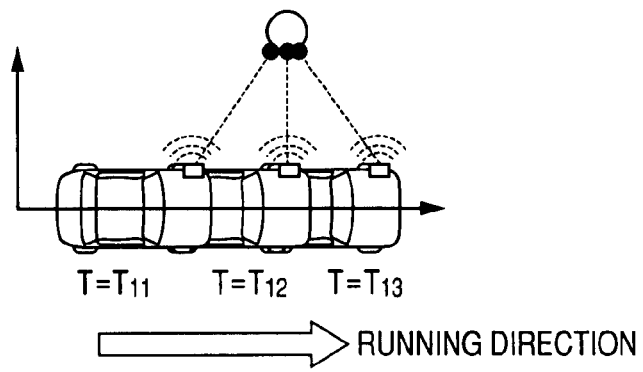
FIG. 12A is an explanatory view showing a detection of an obstacle formed in a vertically extending bar shape.
Figure 12B:
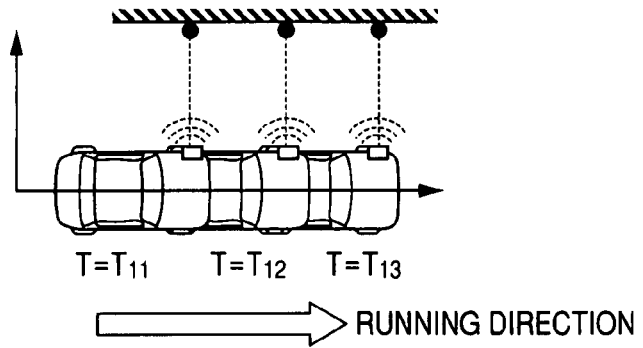
FIG. 12B is an explanatory view showing a detection of an obstacle formed in a wall shape extending along a running direction of a vehicle.

FIG. 12A is an explanatory view showing a detection of an obstacle formed in a vertically extending bar shape, while FIG. 12B is an explanatory view showing a detection of an obstacle formed in a wall shape extending along a running direction of a vehicle. Each obstacle detecting mark is indicated by a black circle.

As shown in FIG. 12A, when an obstacle formed of a pole standing on a road is disposed near a moving vehicle, portions of the obstacle reflecting the transmission signals are gathered in a narrow area. Therefore, a plurality of obstacle detecting marks corresponding to the signal reflecting portions are gathered in a driving support image so as to substantially form a single detecting mark. In contrast, as shown in FIG. 12B, when an obstacle formed of a wall is disposed along a running direction of a vehicle, portions of the obstacle reflecting the transmission signals are away from one another. Therefore, a plurality of obstacle detecting marks corresponding to the signal reflecting portions are displayed to be away from one another. Further, an outline of an obstacle is obtained by connecting a plurality of obstacle detecting marks corresponding to portions of the obstacle reflecting the transmission signals.

Accordingly, a driver can easily recognize a shape of an obstacle from the obstacle detecting marks.

Figure 13A:
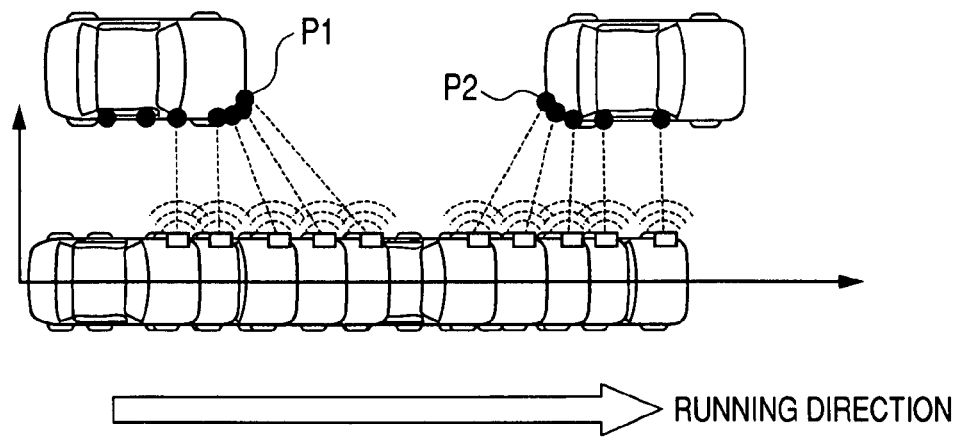
FIG. 13A is an explanatory view showing a present vehicle intending to park in series to another vehicle.
Figure 13B:
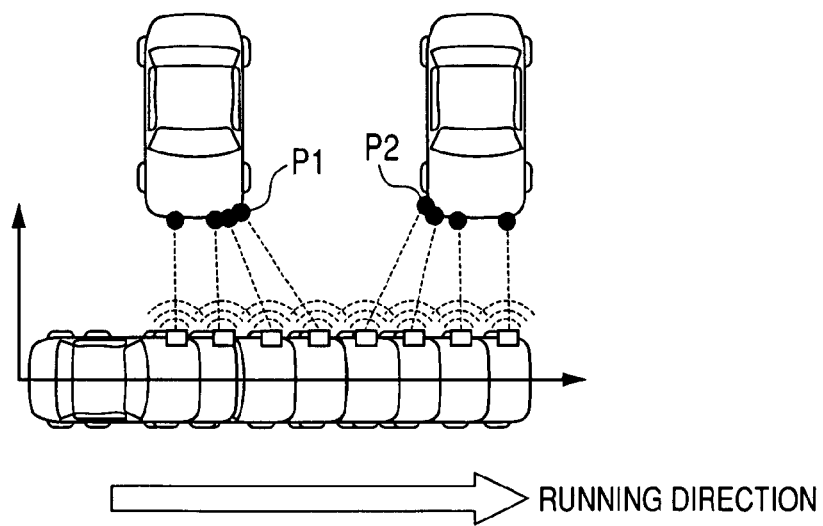
FIG. 13B is an explanatory view showing a present vehicle intending to park in parallel to another vehicle.

Further, the ECU 10 can detect contours of another vehicle adjacent to a present vehicle of a driver or can detect a parking space to park the present vehicle in series to or in parallel to another vehicle. FIG. 13A is an explanatory view showing a present vehicle intending to park in series to another vehicle, while FIG. 13B is an explanatory view showing a present vehicle intending to park in parallel to another vehicle. Each obstacle detecting mark is indicated by a black circle. As shown in each of FIG. 13A and FIG. 13B, when the present vehicle passes by another vehicle, a plurality of obstacle detecting marks are indicated along a body shape of the other vehicle. Therefore, a driver of the present vehicle can recognize contours of an adjacent vehicle. Further, when a driver intends to park a present vehicle in a parking space between other vehicles, first and second obstacle detecting marks P1 and P2 are positioned along contours of first and second vehicles and are indicated to face each other. The ECU 10 calculates a distance between the first and second vehicles from a distance between marks P1 and P2 and judges based on the calculated distance whether or not the present vehicle can safely park in a parking space between the first and second vehicles. Further, when a vehicle intends to automatically park, the ECU 10 sets a target position at a parking area and moves the vehicle so as to place the center of the vehicle (i.e., original point of the two-dimensional coordinates) at the target position.

Moreover, the ECU 10 may display the detecting marks in a vehicle surrounding display region of the display 80. This display area may be the whole area of the display 80 or a portion of the display 80. A liquid crystal display may be used as the display 80. When a navigation system is mounted in a vehicle, a display of the navigation system may be used as the display 80.

Figure 14B:
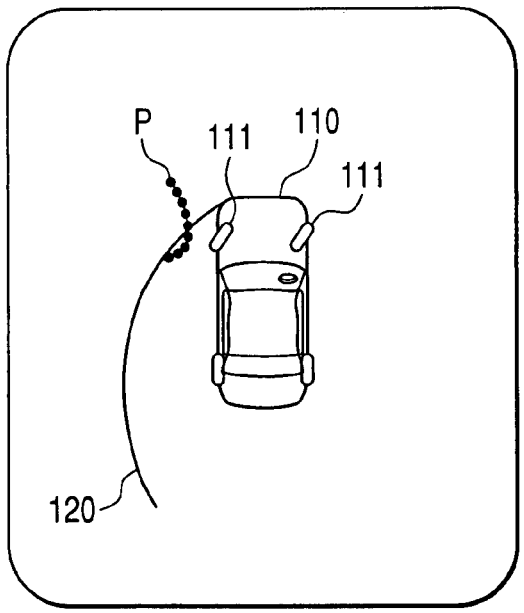
FIG. 14B shows an image including a vehicle figure of the present vehicle shown in FIG. 14A, tire figures of tires of the vehicle, a running locus of the vehicle and obstacle detecting marks of an obstacle according to a first embodiment of the present invention.
Figure 14A:
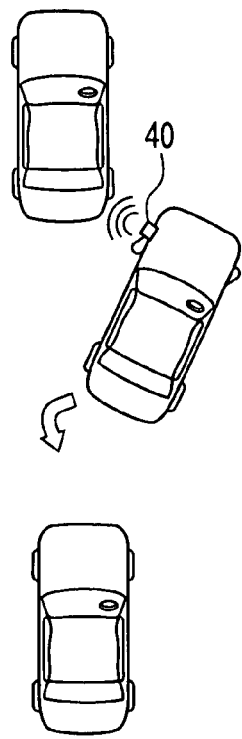
FIG. 14A shows a present vehicle intending to park in series to other vehicles.

FIG. 14A shows a present vehicle intending to park in series to other vehicles, while FIG. 14B shows an image including a vehicle figure of the present vehicle shown in FIG. 14A, tire figures of tires of the vehicle, a running locus of the vehicle and obstacle detecting marks of an object.

As shown in FIG. 14B, the ECU 10 shown in FIG. 1 produces a vehicle figure 110 imitating an external shape of the present vehicle viewed and a tire (or wheel) figure 111 imitating an external shape of each front tire (or wheel) of the vehicle. The figures 110 and 111 are formed by viewing the vehicle and tires in a top view such as a bird's-eye view. The ECU 10 controls the display 80 to display an image including the vehicle figure 110 and the tire figures 111 in a vehicle surrounding display region. The vehicle figure 110 is, for example, placed in the center of the image such that a frond portion of the figure 110 is directed upward. Each tire figure 111 is drawn at a position corresponding to the tire of the vehicle. Each tire figure 111 is directed to the same direction or angle as a direction or angle of the front tire with respect to the vehicle. The direction of the tire figure 111 is calculated according to a steering angle detected in the receiving unit 60.

When the vehicle is moved, the ECU 10 determines a predicted running locus of the present vehicle on the basis of a steering angle and a running speed detected in the unit 60 and draws the locus in the image of the display 80. For example, as shown in FIG. 14B, a predicted running locus 120 of the present vehicle is determined by calculating an arc-shaped locus of an outermost circumference of the present vehicle such that the arc-shaped locus passes through a front left corner of the vehicle figure 110. In this embodiment, a single locus is indicated in the display 80. However, another predicted running locus of the present vehicle may additionally be shown in the display 80. The other running locus is determined by calculating an arc-shaped locus of an innermost circumference of the present vehicle such that the arc-shaped locus passes through a rear right corner of the vehicle figure 110.

As shown in FIG. 14A, the elements 40 are disposed on a left side surface of a bumper placed on a front side of the present vehicle. Transmission signals of the elements 40 are reflected on a portion of an obstacle (i.e., another vehicle) placed in a left side direction from the vehicle. When the present vehicle is moved, for example, to park in series to other vehicles, the portion of the obstacle is changed with time. The ECU 10 detects a position of the obstacle changed with time on the fixed two-dimensional coordinates every predetermined period of time. As shown in FIG. 14B, the ECU 10 controls the display 80 to draw an obstacle detecting mark P indicating a position of a portion of the obstacle in the image every predetermined period of time. Therefore, a plurality of obstacle detecting marks P indicating positions of portions of the obstacle are drawn in the image. However, obstacle detecting marks P placed within a predetermined distance from the present vehicle or the running locus 120 may be selectively shown in the display 80.

As shown in FIG. 14B, the running locus 120 intersects with an outline of the obstacle determined by serially connecting the obstacle detecting marks P. Therefore, a driver can easily recognize from the running locus 120 and the detecting marks P that the present vehicle presumably collides with the obstacle when the steering angle is maintained, and the driver can avoid a collision with the obstacle by changing the steering wheel.

Further, the tire figure 111 is drawn in the display area such that an angle or direction of the tire FIG. 111 with respect to the vehicle figure 110 is changed according to a steering angle of the present vehicle. Therefore, an angle or direction of the tire figure 111 with respect to the vehicle figure 110 is the same as that of the corresponding front tire with respect to the vehicle. When viewing the tire figure 111, a driver can easily realize a steering angle of a tire or a turning rate of the present vehicle. That is, a driver can intuitively realize how the vehicle is now turned.

Figure 15:
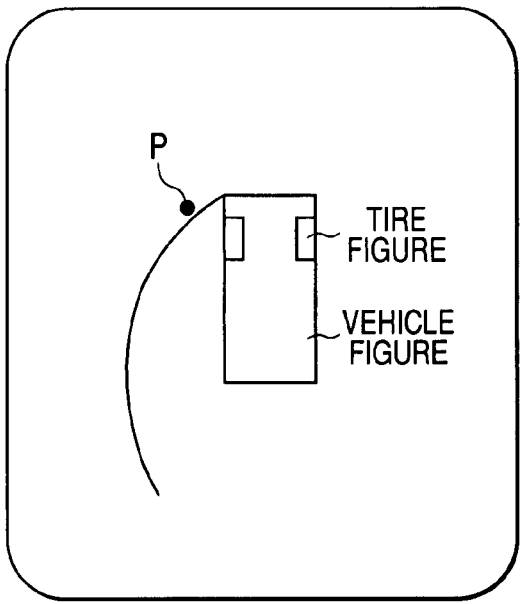
FIG. 15 shows an image including a figure of the present vehicle shown in FIG. 14A according to a prior art.

FIG. 15 shows an image including a figure of the present vehicle of FIG. 14A according to a prior art. As shown in FIG. 15, a direction of a tire figure with respect to a vehicle figure is fixed regardless of a steering angle of the vehicle. Therefore, a driver cannot realize how the vehicle is now turned.

Accordingly, because an angle or direction of the tire figure 111 is changed according to a steering angle in this embodiment, a driver can visually recognize a steering angle of a tire or a turning rate of a vehicle and realize how his or her driving operation should be changed to avoid a collision with an obstacle.

In this embodiment, each tire figure 111 is placed at a position corresponding to a position of a tire of a vehicle. However, the tire figure 111 may be placed out of the vehicle figure 110.

Further, in this embodiment, a ratio of a size of each tire figure 111 to a size of the vehicle figure 110 is set to be almost equal to a ratio of a size of a tire to a size of a vehicle. However, the size of each tire figure 111 may be arbitrarily set. For example, a tire figure 111 having an enlarged size may be drawn out of the vehicle figure 110 such that a driver can easily view the tire figure 111.

Modification of Embodiment 1

In this modification, the ECU 10 controls the camera 70 to photograph an obstacle such as another vehicle, and the ECU 10 produces a bird's-eye view of the obstacle photographed by the camera 70. The unit 90 is not used, so that no obstacle detecting marks are indicated on the display 80. A technique of displaying a bird's-eye view of an object photographed by an on-vehicle camera is well known. For example, this technique is disclosed in Published Japanese Patent First Publication No. H10-211849, so that the technique is not described in more detail.

Figure 16:
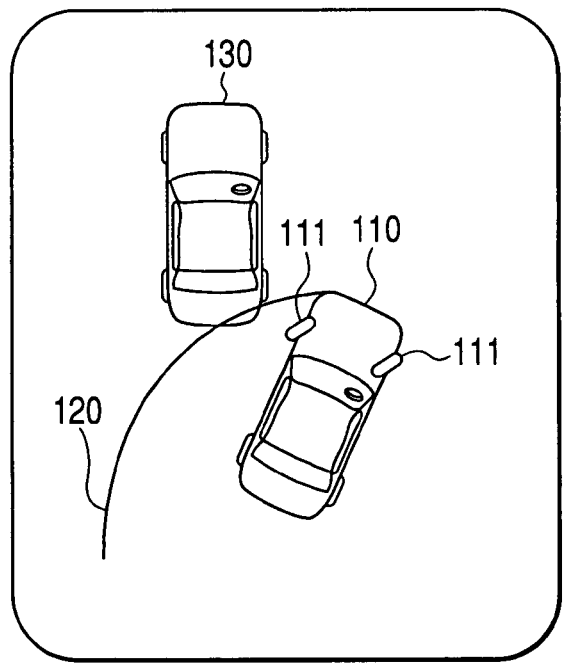
FIG. 16 shows an image of a vehicle figure of a present vehicle photographed by an on-vehicle camera according to a modification of the first embodiment.

FIG. 16 shows an image of a vehicle figure of a present vehicle shown in FIG. 14A and photographed by an on-vehicle camera. A present vehicle intends to park in series to another vehicle, and real conditions of these vehicles are shown in FIG. 14A. A vehicle figure 110 of the present vehicle is shown in a bird's-eye view.

An external shape 130 of another vehicle shown in a bird's-eye view in FIG. 16 is obtained from data of a vehicle photographed by the camera 70. FIG. 16 is formed by combining the external shape 130 and the vehicle figure 110 of the present vehicle. As shown in FIG. 16, when an obstacle existing around the present vehicle is displayed, an angle or direction of the tire figure 111 with respect to the vehicle figure 110 is changed according to a steering angle of the present vehicle.

Accordingly, a driver can visually realize a steering angle of a tire or a turning rate of the present vehicle. That is, a driver can intuitively recognize how the vehicle is now turned, so that a driver can easily realize how his or her driving operation should be changed to avoid a collision with an obstacle.

Embodiment 2

In this embodiment, the ECU 10 produces a repetitive figure and controls the display 80 to draw the repetitive figure such that the repetitive figure is superimposed on the vehicle figure 110 of the image shown on the display 80 and is moved in accordance with a running speed and a steering angle of the present vehicle. The repetitive figure is formed of a plurality of predetermined figures repeatedly arranged at equal intervals along each of longitudinal and lateral directions of the image. A grid figure represents the repetitive figure. This grid figure is formed of a plurality of longitudinal lines arranged at equal intervals and a plurality of lateral lines arranged at equal intervals.

Figure 17:
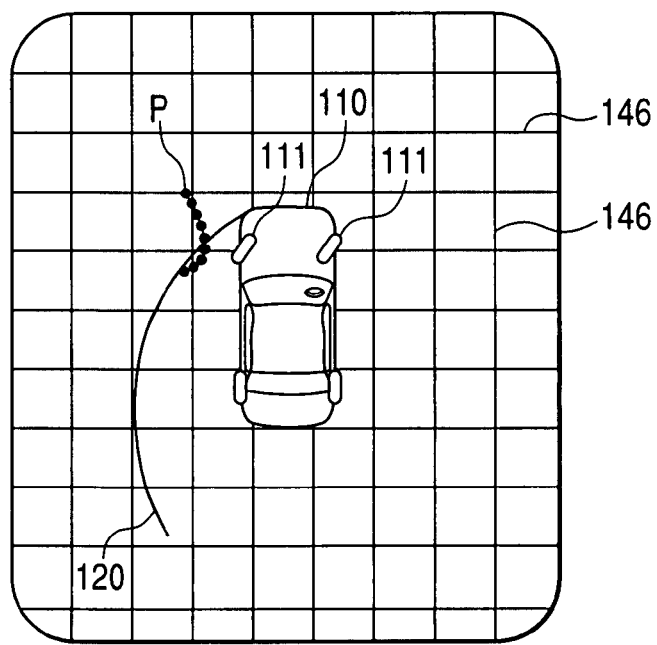
FIG. 17 is an image of a grid figure superimposed on a vehicle figure according to a second embodiment of the present invention.

FIG. 17 is an image of a grid figure superimposed on the vehicle figure 110. A grid figure 146 shown in FIG. 17 is moved relative to the vehicle figure 110 in accordance with a running speed and a steering angle of the present vehicle received in the unit 60, while the vehicle figure 110 is fixed in the center of the image shown in the display 80. In other words, the grid figure 146 is scroll-displayed.

Accordingly, when a driver views the grid figure 146 moved relative to the vehicle figure 110 in accordance with a running speed and a steering angle of his or her vehicle, a driver can easily realize both a running speed and a turning rate of the vehicle.

In this embodiment, the tire figures 111 are illustrated with the vehicle figure 110 for a driver to realize a turning rate of his or her vehicle. However, because a driver viewing the grid figure 146 can easily realize both a running speed and a turning rate of his or her vehicle, no tire figure may be displayed on the display 80.

Further, when the vehicle is moved, obstacle detecting marks P are sometimes displayed one after another with the vehicle figure 110 while changing a position of each mark P newly displayed. Therefore, even when no grid figure is displayed with the vehicle figure 110, a driver viewing the marks P displayed one after another can easily realize a running speed and a turning rate of his or her vehicle from a moving direction and a moving speed of a group of detecting marks P. To simplify an image shown on the display 80, when obstacle detecting marks P are displayed one after another with the vehicle figure 110, no grid figure may be displayed on the display 80. In this case, a driver can easily view an image including the vehicle figure 110 and the marks P.

Figure 18:
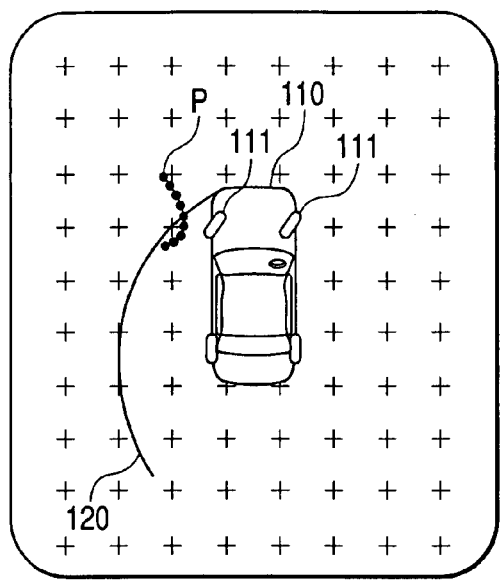
FIG. 18 is an image of a cross figure superimposed on a vehicle figure.

Moreover, in place of the grid figure, a cross figure formed of a plurality of crosses "+" arranged in a matrix shape may be displayed with the vehicle figure 110. An image of a cross figure superimposed on the vehicle figure 110 is shown in FIG. 18. Further, a point figure formed of a plurality of points ".", arranged in a matrix shape may be displayed with the figures 110 and 111.

Embodiment 3

In this embodiment, the ECU 10 produces an enlarged image and a wider-area image and controls the display 80 to display the enlarged image with the wider-area image. The enlarged image includes at least one of obstacle detecting marks P, a portion of a vehicle figure 110 and a predicted running locus 120 of which sizes are enlarged. The wider-area image includes the whole vehicle figure 110, obstacle detecting marks P and the running locus 120.

Figure 19:
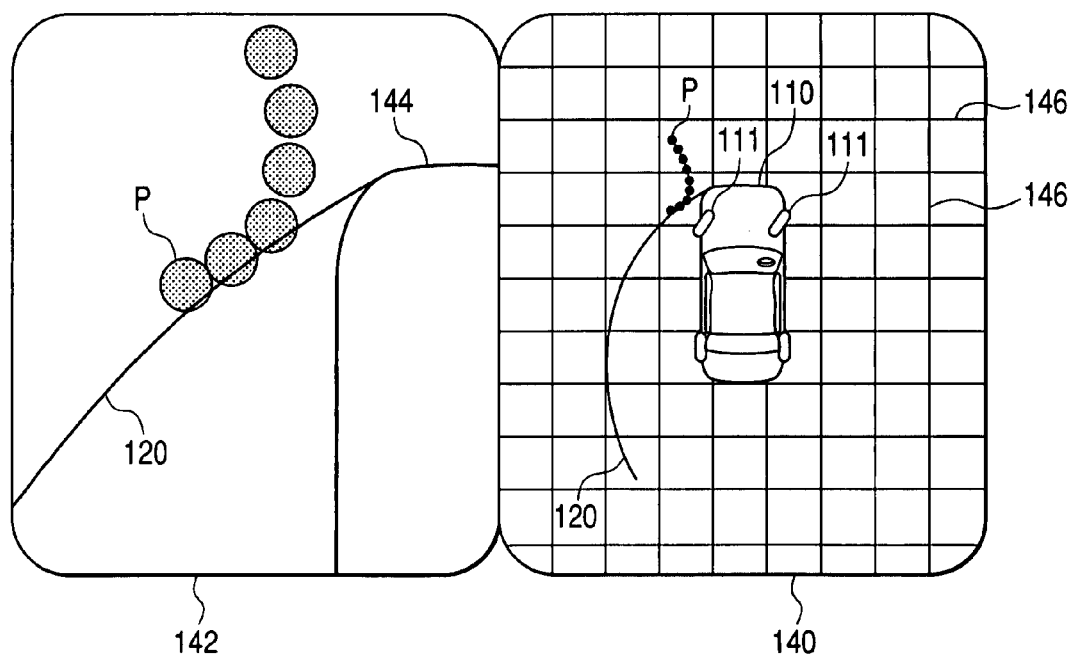
FIG. 19 shows both an enlarged image and a wider-area image simultaneously displayed on a display according to a third embodiment of the present invention.

FIG. 19 shows an enlarged image and a wider-area image simultaneously displayed on the display 80. As shown in FIG. 19, a wider-area image 140 including the figures 110 and 111, the detecting marks P, the predicted running locus 120 and the grid figure 146 is displayed in a top view such as a bird's-eye view in a right half portion of the vehicle surrounding display region of the display 80, and an enlarged image 142 is displayed in a top view such as a bird's-eye view in a left half portion of the vehicle surrounding display region. That is, the enlarged image 142 is displayed with the wider-area image 140. The wider-area image 140 is almost the same as an image shown in FIG. 17. The enlarged image 142 is obtained by enlarging a portion of the image 140 in which at least one detecting mark P and a portion of the vehicle figure 110 are drawn. A size of the image 142 is almost the same as a size of the image 140. The enlarged image 142 includes the detecting marks P, the running locus 120 and an enlarged vehicle portion figure 144. The figure 144 is obtained by enlarging a portion of the vehicle figure 110 nearest to the detecting marks P. In this embodiment, the figure 144 indicates a front left corner portion of the vehicle.

When viewing the enlarged image 142, a driver can predict with high precision whether or not his or her vehicle is about to collide with the obstacle. In this case, it is difficult for the driver to presume a distance between the vehicle and the obstacle on the basis of the enlarged image 142. To facilitate the driver's presumption, the wider-area image 140 is displayed with the enlarged image 142. When viewing the wider-area image 140, the driver can compare a size of the vehicle figure 110 and a distance between the vehicle figure 110 and a group of detecting marks P. Because the driver knows an actual size of the vehicle, the driver can easily and rapidly recognize a distance between the vehicle and the obstacle.

Accordingly, because the enlarged image 142 is displayed with the wider-area image 140, a driver can predict with high precision whether or not his or her vehicle is about to collide with the obstacle, and the driver can easily and rapidly recognize a distance between the vehicle and the obstacle.

Embodiment 4

In this embodiment, the ECU 10 produces an enlarged vehicle outline figure by enlarging an outline of the vehicle figure 110 and controls the display 80 to draw the outline figure with the vehicle figure 110 such that a center of the outline figure accords with a center of the vehicle figure 110.

Figure 20:
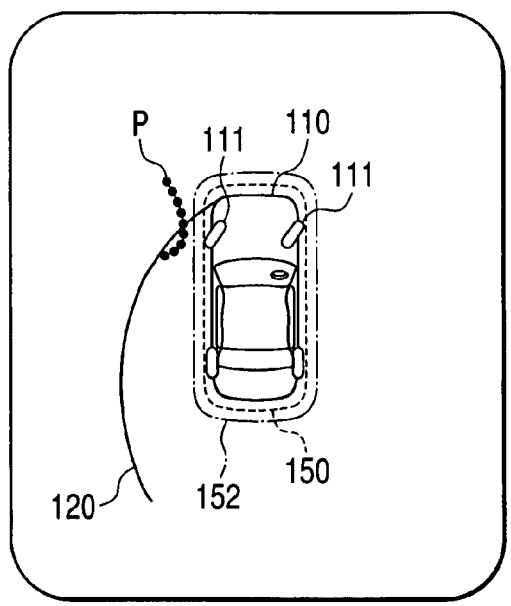
FIG. 20 shows a display image including a vehicle figure and enlarged vehicle outline figures so as to have the same gravity center as that of the vehicle figure according to a fourth embodiment of the present invention.

FIG. 20 shows a display image including first and second enlarged vehicle outline figures so as to have the same gravity center as that of the vehicle figure 110. As shown in FIG. 20, first and second enlarged vehicle outline figures 150 and 152 are additionally displayed on the display 80. The figure 150 is larger than an outline of the vehicle figure 110 by a first factor of enlargement, and the figure 152 is larger than an outline of the vehicle figure 110 by a second factor of enlargement. The second factor is larger than the first factor. A gravity center of each of the outline figures 150 and 152 accords with a gravity center of the vehicle figure 110.

The outline figure 150 surrounds the vehicle figure 110, and the outline figure 152 surrounds the vehicle figure 110 and the outline figure 150. A driver performs a parking operation for his or her vehicle while confirming a positional relation between each detecting mark P and each of the outline figures 150 and 152. More specifically, the driver moves the vehicle while preventing the outline figure 152 or the outline figures 150 and 152 from intersecting with any of the detecting marks P.

Accordingly, because the driver can move the vehicle while preventing the outline figure 152 or the outline figures 150 and 152 surrounding the vehicle figure 110 from intersecting with any detecting mark P, the driver can safely move the vehicle without a collision of the vehicle with an obstacle.

In this embodiment, only a single enlarged vehicle outline figure may be displayed with the vehicle figure 110. In this case, the driver moves the vehicle while preventing the enlarged vehicle outline figure from intersecting with any of the detecting marks P.

These embodiments should not be construed as limiting the present invention to structures of those embodiments, and the structures of those embodiments may be combined with each other or may be combined with that based on the prior art.

For example, although the vehicle figure 110 has a shape imitating a shape of the vehicle in the embodiments, the vehicle figure 110 may have a rectangular shape.

Figure 21B:
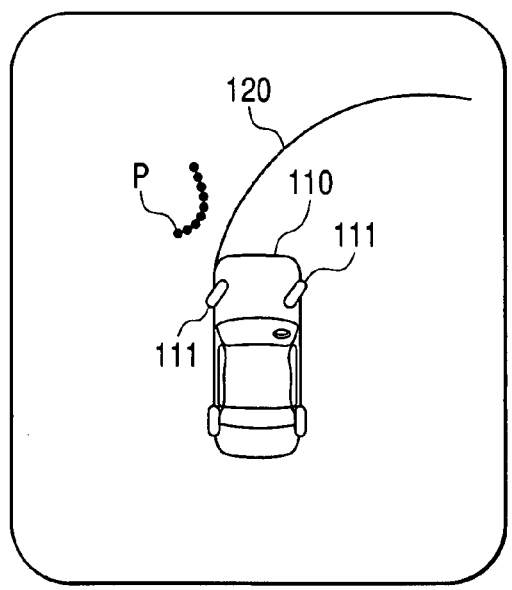
FIG. 21B shows an image including a vehicle figure of the vehicle shown in FIG. 21A.
Figure 21A:
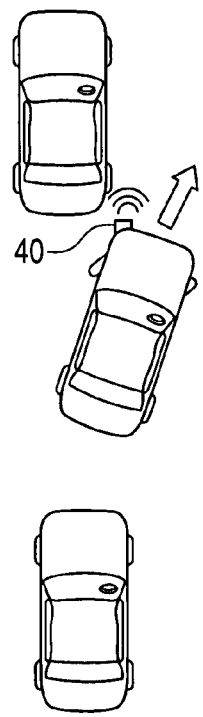
FIG. 21A shows a present vehicle intending to go forward from a parking area.

Further, an image is shown on the display 80 when the vehicle is moved backward. However, when the vehicle is moved forward, an image may be shown on the display 80. FIG. 21A shows a present vehicle intending to go forward from a parking area, while FIG. 21B shows an image of the vehicle figure 110 indicating the vehicle shown in FIG. 21A. As shown in FIG. 21A and FIG. 21B, when a present vehicle parked serially to another vehicle goes forward, the vehicle figure 110 shown in FIG. 21B is indicated on the display 80. The elements 40 are placed on a left end side of a front end body surface of the vehicle.

Figure 22:
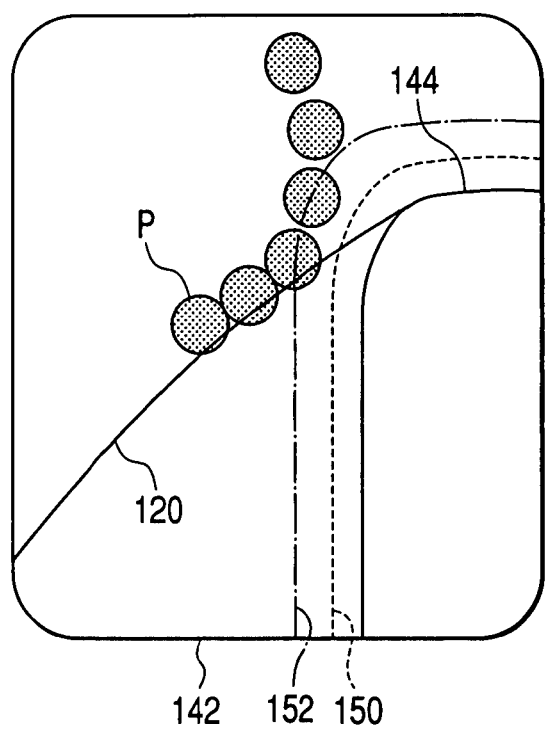
FIG. 22 shows an enlarged image including a portion of a vehicle figure and portions of enlarged vehicle outline figures.
Figure 23:
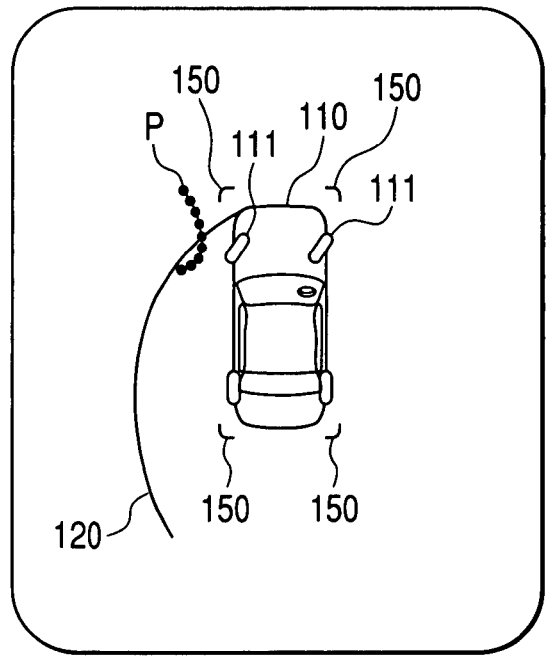
FIG. 23 shows an image of a vehicle figure and four corner portions of an enlarged vehicle outline figure.

Moreover, an enlarged vehicle outline figure may be drawn in the enlarged image 142 shown in FIG. 19. FIG. 22 shows an enlarged image including a portion of a vehicle figure and portions of enlarged vehicle outline figures. As shown in FIG. 22, a portion of the first enlarged vehicle outline figure 150, a portion of the second enlarged vehicle outline figure 152 and the enlarged vehicle portion figure 144 are displayed with a plurality of object detecting marks P on the display 80 as an enlarged image 143. Further, a portion of an enlarged vehicle outline figure may be drawn in an image shown on the display 80. FIG. 23 shows an image of the vehicle figure 110 and four corner portions of the enlarged vehicle outline figure 150. As shown in FIG. 23, four corner portions of the enlarged vehicle outline figure 150 are shown with the vehicle figure 110 on the display 80 such that a gravity center of the corner portions of the enlarged vehicle outline figure 150 accords with a gravity center of the vehicle figure 110.

Furthermore, in the embodiments, an image on the display 80 is automatically renewed every predetermined period of time. However, the driving support apparatus 100 may further have a display renewal instruction switch. When a driver turns on this switch, an image on the display 80 is renewed to show the vehicle figure 110, the detecting marks P and the running locus 120 at a switch turning-on time on the display 80.

Still further, in the embodiments, a composite directivity of the transmission signals is alternately set at a wide-angle directivity and a narrow-angle directivity, and a composite directivity of the reception signals is set so as to match with the composite directivity of the transmission signals. However, the setting of the composite directivity of the transmission signals may be changed after the detection of an obstacle. More specifically, a composite directivity of the transmission signals is alternately set at a wide-angle directivity and a narrow-angle directivity until an obstacle is detected. When an obstacle is detected, the reception controller 30 determines a position of the obstacle relative to the vehicle, and the ECU 10 controls the composite directivity of the transmission signals such that the relative position of the obstacle is placed within a range of the composite directivity.

Still further, in the embodiments, the elements 40 are disposed on a horizontal plane, and a composite directivity of the transmission signals is alternately set at a wide-angle directivity and a narrow-angle directivity. Therefore, the apparatus 100 can search a wide area on the horizontal plane for an obstacle. However, the elements 40 may be disposed on a vertical plane. In this case, when a composite directivity of the transmission signals is alternately set at a wide-angle directivity and a narrow-angle directivity, the apparatus 100 can search a wide area on the vertical plane for an obstacle.

Figure 24A:
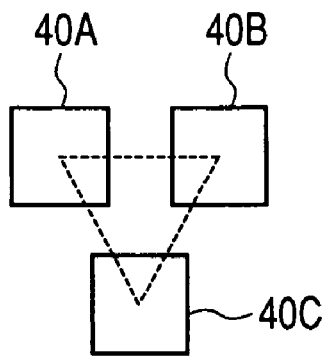
FIG. 24A is a view of three elements disposed on a vertical plane in a triangular arrangement.
Figure 24A:

Still further, in the embodiments, a set of two elements 40 are used to detect a position of an obstacle. However, a single element 40 may be used to detect a position of an obstacle disposed in a predetermined direction. In contrast, a set of three elements 40 may be used. When three elements 40 are disposed on a vertical plane in a triangular arrangement, the apparatus 100 can detect a position of an obstacle in three-dimensional coordinates. FIG. 24A is a view of three elements. As shown in FIG. 24A, the three elements 40A, 40B and 40C are disposed on a vertical plane in a triangular arrangement to be away from one another by a half length $\lambda/2$ of the wavelength $\lambda$ of the transmission signals. The elements 40A and 40B are placed at the same height on a horizontal plane. A composite directivity of the transmission signals outputted from the elements 40A and 40B is alternately set at a wide-angle directivity and a narrow-angle directivity. Therefore, the apparatus 100 can search a wide area on the horizontal plane for an obstacle and can determine a position of the obstacle on the horizontal plane. Further, the elements 40A (or 40B) and 40C are placed at different heights on a vertical plane. A composite directivity of the transmission signals outputted from the elements 40A (or 40B) and 40C is alternately set at a wide-angle directivity and a narrow-angle directivity. Therefore, the apparatus 100 can search a wide area on the vertical plane for an obstacle and can determine a position of the obstacle on the vertical plane. Accordingly, the apparatus 100 can determine a position of the obstacle in three-dimensional coordinates.

Figure 24B:
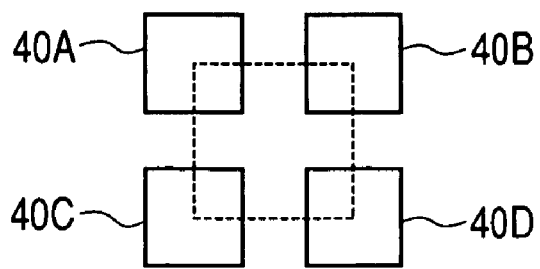
FIG. 24B is a view of four elements disposed on a vertical plane in a rectangular arrangement.
Figure 24B:

Still further, a set of four elements 40 may be used. When four elements 40 are disposed on a vertical plane in a square arrangement, the apparatus 100 can detect a position of an obstacle in three-dimensional coordinates with high precision. FIG. 24B is a view of four elements. As shown in FIG. 24B, four elements 40A, 40B, 40C and 40D are disposed on a vertical plane in a rectangular arrangement. The elements 40A and 40B are placed at the same height on a horizontal plane, and the elements 40C and 40D are placed at the same height on another horizontal plane. The elements 40A and 40C are placed at different heights on a vertical plane, and the elements 40B and 40D are placed at different heights on another vertical plane. When using a set of elements 40A and 40B and a set of elements 40C and 40D, the apparatus 100 can determine a position of an obstacle on a horizontal plane with high precision from a position of the obstacle detected from reception signals of the elements 40A and 40B and a position of the obstacle detected from reception signals of the elements 40C and 40D. When using a set of elements 40A and 40C and a set of elements 40B and 40D, the apparatus 100 can determine a position of the obstacle on a vertical plane with high precision from a position of the obstacle detected from reception signals of the elements 40A and 40C and a position of the obstacle detected from reception signals of the elements 40B and 40D. Accordingly, the apparatus 100 can detect a position of an obstacle in three-dimensional coordinates with high precision.

Still further, in the embodiments, the elements 40 are disposed near a position placed just above a front wheel of the vehicle on a side surface of the vehicle. However, the elements 40 may be disposed at another position such as a position placed above a rear wheel of the vehicle on a side surface of the vehicle.

Still further, in the embodiments, each obstacle detecting mark P is indicated by a black circle. However, a shape or color of each obstacle detecting mark P may be changed dependent on a distance between the mark P and the vehicle. In this case, a driver can easily grasp a distance between the vehicle and an obstacle.

Still further, when each element 40 is formed of an ultrasonic microphone, the microphone has reverberation for a time after outputting ultrasonic waves. Therefore, when the microphone having reverberation receives a reception signal, the reverberation is undesirably superimposed on the reception signal. Therefore, the reception controller 30 cannot accurately detect reflection waves, so that the controller 30 cannot accurately determine a position of an obstacle. To avoid this problem, the element 40 is adapted not to receive any reception signal for a predetermined dead time after outputting ultrasonic waves. The dead time is determined such that reverberation occurring in the ultrasonic microphone disappears during the dead time. In this case, when the element 40 receives a reception signal having an amplitude larger than a predetermined value before the dead time is finished, a position of an obstacle is set at a position of the obstacle just previously set.

Still further, in the embodiments, a direction of an obstacle from the vehicle is calculated from a phase difference between two reflection waves received in the elements 40 according to the formula (3). However, a direction of an obstacle may be determined from a time difference between the two reflection waves.

Still further, when the ECU 10 detects that a distance between a vehicle and an obstacle becomes smaller than a predetermined value, the ECU 10 may lower a running speed of the vehicle to a sufficiently low value or may stop the vehicle. Alternatively, the ECU 10 may control the alarm unit 95 to output an alarm sound.

What is claimed is:

1. A driving support apparatus, comprising:
   a display mounted in a vehicle;
   a driving information receiving unit that receives a steering angle of a steering wheel of the vehicle; and
   a control unit that produces a vehicle figure indicating a shape of the vehicle in a top view, produces a tire figure indicating a shape of a tire of the vehicle in the top view, and controls the display to display the vehicle figure and the tire figure in the top view while changing a direction of the tire figure with respect to the vehicle figure according to the steering angle received in the driving information receiving unit,
   wherein the control unit is adapted to determine a predicted running locus of the vehicle according to the steering angle of the vehicle received in the driving information receiving unit, and to control the display to draw the running locus with the vehicle figure and the tire figure in the top view.

2. The apparatus according to claim 1, further comprising:
   an object detecting unit detects a position of an object existing around the vehicle,
   wherein the control unit produces an object detecting mark indicating the position of the object detected by the object detecting unit and controls the display to display the object detecting mark with the running locus, the vehicle figure and the tire figure in the top view.

3. The apparatus according to claim 2, wherein the control unit is adapted to produce an enlarged vehicle outline figure, determined by enlarging an outline of the vehicle figure, or a portion of the enlarged vehicle outline figure, and to control the display to display the enlarged vehicle outline figure or the portion of the enlarged vehicle outline figure such that a center of the enlarged vehicle outline figure accords with a center of the vehicle figure.

4. The apparatus according to claim 3, wherein the enlarged vehicle outline figure has a first enlarged vehicle outline figure determined by enlarging an outline of the vehicle figure by a first factor and a second enlarged vehicle outline figure determined by enlarging an outline of the vehicle figure by a second factor different from the first factor.

5. The apparatus according to claim 1,
   wherein the driving information receiving unit is adapted to receive a running speed of the vehicle, and
   wherein the control unit is adapted to determine running locus of the vehicle in the display according to the steering angle and the running speed of the vehicle received in the driving information receiving unit.

6. The apparatus according to claim 2, wherein the object detecting unit has an object detecting element, disposed on a front side of a side surface of the vehicle, for outputting a transmission signal, receiving a reception signal obtained by reflecting the transmission signal on the object, and the object detecting unit detects the position of the object from the reception signal when the vehicle goes backward.

7. The apparatus according to claim 2, wherein the object detecting unit has a set of three object detecting elements disposed on a vertical plane in a triangular arrangement on a side surface of the vehicle such that two of the three object detecting elements are set at the same height, each of the object detecting elements outputs a transmission signal in a side direction almost perpendicular to a longitudinal direction extending from a front side to a rear side of the vehicle and receives a reception signal obtained by reflecting the transmission signal on the object, and the object detecting unit intermittently detects the position of the portion of the object from the reception signals of the object detecting elements.

8. The apparatus according to claim 2, wherein the object detecting unit has a set of four object detecting elements disposed on a vertical plane in a rectangular arrangement on a side surface of the vehicle such that two of the four object detecting elements are set at the same height, each of the object detecting elements outputs a transmission signal in a side direction almost perpendicular to a longitudinal direction extending from a front side to a rear side of the vehicle and receives a reception signal obtained by reflecting the transmission signal on the object, and the object detecting unit intermittently detects the position of the portion of the object from the reception signals of the object detecting elements.

9. The apparatus according to claim 1, wherein the driving information receiving unit is adapted to receive a running speed of the vehicle, and the control unit is adapted to produce a repetitive figure having a plurality of predetermined figures aligned along each of first and second directions perpendicular to each other, and controls the display to display the repetitive figure such that the repetitive figure is moved relative to the vehicle figure on the basis of the steering angle and the running speed of the vehicle received in the driving information receiving unit.

10. The apparatus according to claim 1, further comprising:
    an object detecting unit that detects a position of an object,
    wherein the driving information receiving unit is adapted to receive a running speed of the vehicle,
    and wherein the control unit is adapted to determine a portion of the vehicle nearest to the object on the basis of the position of the object detected by the object detecting unit, to produce an enlarged vehicle portion figure indicating an enlarged shape of the portion of the vehicle, to control the display to display an enlarged image including the enlarged vehicle portion figure and the running locus and a wider-area image including the running locus, the vehicle figure and the tire figure in the top view, to determine a marking position corresponding to the position of the object detected by the object detecting unit in each of the enlarged image and the wider-area image on the basis of the running speed and the steering angle of the vehicle received by the driving information receiving unit, to control the display to draw a first detecting mark placed at the marking position in the wider-area image, and to control the display to draw a second detecting mark placed at the marking position in the enlarged image, the second detecting mark having a size larger than a size of the first detecting mark.

11. A driving support apparatus, comprising:
    a display mounted in a vehicle;
    a driving information receiving unit that receives a steering angle of a steering wheel of the vehicle and a running speed of the vehicle; and
    a control unit that produces a vehicle figure indicating a shape of the vehicle in a top view, produces a grid figure, and controls the display to display the vehicle figure and the grid figure in the top view such that the grid figure is moved relative to the vehicle figure on the basis of the steering angle and the running speed of the vehicle received in the driving information receiving unit.

12. The apparatus according to claim 11, further comprising:

an object detecting unit that detects a position of an object existing around the vehicle, wherein the control unit produces an object detecting mark indicating the position of the object detected by the object detecting unit and controls the display to display the object detecting mark with the vehicle figure and the grid figure.

13. The apparatus according to claim 12, wherein the control unit is adapted to produce an enlarged vehicle outline figure, determined by enlarging an outline of the vehicle figure, or a portion of the enlarged vehicle outline figure, and to control the display to display the enlarged vehicle outline figure or the portion of the enlarged vehicle outline figure in the top view such that a center of the enlarged vehicle outline figure accords with a center of the vehicle figure.

14. The apparatus according to claim 13, wherein the enlarged vehicle outline figure has a first enlarged vehicle outline figure determined by enlarging an outline of the vehicle figure by a first factor and a second enlarged vehicle outline figure determined by enlarging an outline of the vehicle figure by a second factor different from the first factor.

15. The apparatus according to claim 11,
wherein the control unit is adapted to determine a drawing position of a running locus of the vehicle in the display according to the steering angle and the running speed of the vehicle received in the driving information receiving unit, and to control the display to draw the running locus at the drawing position in the top view.

16. The apparatus according to claim 12, wherein the object detecting unit has an object detecting element, disposed on a front side of a side surface of the vehicle, for outputting a transmission signal, receiving a reception signal obtained by reflecting the transmission signal on the object, and the object detecting unit intermittently detects the position of the portion of the object from the reception signal when the vehicle goes backward.

17. The apparatus according to claim 12, wherein the object detecting unit has a set of three object detecting elements disposed on a vertical plane in a triangular arrangement on a side surface of the vehicle such that two of the three object detecting elements are set at the same height, each of the object detecting elements outputs a transmission signal in a side direction almost perpendicular to a longitudinal direction extending from a front side to a rear side of the vehicle and receives a reception signal obtained by reflecting the transmission signal on the object, and the object detecting unit intermittently detects the position of the portion of the object from the reception signals of the object detecting elements.

18. The apparatus according to claim 12, wherein the object detecting unit has a set of four object detecting elements disposed on a vertical plane in a rectangular arrangement on a side surface of the vehicle such that two of the four object detecting elements are set at the same height, each of the object detecting elements outputs a transmission signal in a side direction almost perpendicular to a longitudinal direction extending from a front side to a rear side of the vehicle and receives a reception signal obtained by reflecting the transmission signal on the object, and the object detecting unit intermittently detects the position of the portion of the object from the reception signals of the object detecting elements.

19. The apparatus according to claim 11, wherein the control unit is adapted to produce a tire figure indicating a shape of a tire of the vehicle in the top view, to determine a drawing position of a running locus of the vehicle in the display according to the steering angle and the running speed of the vehicle received in the driving information receiving unit, to control the display to display the tire figure while changing a direction of the tire figure with respect to the vehicle figure according to the steering angle received in the driving information receiving unit, and to control the display to draw the running locus at the drawing position in the top view.

20. The apparatus according to claim 11, further comprising:

an object detecting unit that detects a position of an object, wherein the control unit is adapted to determines a portion of the vehicle nearest to the object on the basis of the position of the object detected by the object detecting unit, to produce an enlarged vehicle portion figure indicating an enlarged shape of the portion of the vehicle, to control the display to display an enlarged image including the enlarged vehicle portion figure in a top view, to control the display to display a wider-area image of the vehicle figure and the grid figure, to determine a marking position corresponding to the position of the object detected by the object detecting unit in each of the enlarged image and the wider-area image on the basis of the running speed and the steering angle of the vehicle received by the driving information receiving unit, to control the display to draw a first detecting mark placed at the marking position in the wider-area image, and to control the display to draw a second detecting mark placed at the marking position in the enlarged image, the second detecting mark having a size larger than a size of the first detecting mark.

21. A driving support apparatus, comprising:
a display mounted in a vehicle;
a driving information receiving unit that receives a steering angle of a steering wheel of the vehicle and a running speed of the vehicle;
an object detecting unit that detects a position of an object; and
a control unit that produces a vehicle figure indicating a whole shape of the vehicle in a top view, determines a portion of the vehicle nearest to the object on the basis of the position of the object detected by the object detecting unit, produces an enlarged vehicle portion figure indicating an enlarged shape of the portion of the vehicle, and controls the display to display a wider-area image including the vehicle figure and an enlarged image including the enlarged vehicle portion figure, determines a marking position of each of the wider-area image and the enlarged image corresponding to the position of the object detected by the object detecting unit on the basis of the running speed and the steering angle of the vehicle received by the driving information receiving unit, controls the display to draw a first detecting mark placed at the marking position in the wider-area image, and controls the display to draw a second detecting mark placed at the marking position in the enlarged image, the second detecting mark having a size larger than a size of the first detecting mark.

22. The apparatus according to claim 21, wherein the control unit is adapted to produce a tire figure indicating a shape of a tire of the vehicle in the top view, to determine a drawing position of a running locus of the vehicle in the display according to the steering angle and the running speed of the vehicle received in the driving information receiving unit, to control the display to display the tire figure in the wider-area image while changing a direction of the tire figure with respect to the vehicle figure according to the steering angle received in the driving information receiving unit, and to control the display to draw the running locus at the drawing position.

23. The apparatus according to claim 21, wherein the control unit is adapted to produce a repetitive figure having a plurality of predetermined figures aligned along each of first and second directions perpendicular to each other, and controls the display to display the repetitive figure in the wider-area image such that the repetitive figure is moved relative to the vehicle figure on the basis of the steering angle and the running speed of the vehicle received in the driving information receiving unit.

24. The apparatus according to claim 21, wherein the object detecting unit is adapted to intermittently detect a position of a portion of the object relative to a position of the vehicle moved with a time while changing the portion of the object with the time, and the control unit is adapted to determine a plurality of marking positions of the display corresponding to the positions of the portions of the object detected by the object detecting unit on the basis of the running speed and the steering angle of the vehicle received by the driving information receiving unit, to control the display to draw a plurality of detecting marks at the respective marking positions, to produce an enlarged vehicle outline figure obtained by enlarging an outline of the vehicle figure, and to control the display to display the enlarged vehicle outline figure such that a center of the enlarged vehicle outline figure accords with a center of the vehicle figure.

25. The apparatus according to claim 21, wherein the object detecting unit has an object detecting element, disposed on a front side of a side surface of the vehicle, for outputting a transmission signal, receiving a reception signal obtained by reflecting the transmission signal on the object, and the object detecting unit detects the position of the object from the reception signal when the vehicle goes backward.

26. The apparatus according to claim 24, wherein the object detecting unit has a set of three object detecting elements disposed on a vertical plane in a triangular arrangement on a side surface of the vehicle such that two of the three object detecting elements are set at the same height, each of the object detecting elements outputs a transmission signal in a side direction almost perpendicular to a longitudinal direction extending from a front side to a rear side of the vehicle and receives a reception signal obtained by reflecting the transmission signal on the object, and the object detecting unit intermittently detects the position of the portion of the object from the reception signals of the object detecting elements.

27. The apparatus according to claim 24, wherein the object detecting unit has a set of four object detecting elements disposed on a vertical plane in a rectangular arrangement on a side surface of the vehicle such that two of the four object detecting elements are set at the same height, each of the object detecting elements outputs a transmission signal in a side direction almost perpendicular to a longitudinal direction extending from a front side to a rear side of the vehicle and receives a reception signal obtained by reflecting the transmission signal on the object, and the object detecting unit intermittently detects the position of the portion of the object from the reception signals of the object detecting elements.

28. The apparatus according to claim 21, wherein the control unit is adapted to produce an enlarged vehicle outline figure, determined by enlarging an outline of the vehicle figure, or a portion of the enlarged vehicle outline figure, and to control the display to draw the enlarged vehicle outline figure or the portion of the enlarged vehicle outline figure in the wider-area image or the enlarged image such that a center of the enlarged vehicle outline figure accords with a center of the vehicle figure.

29. The apparatus according to claim 28, wherein the enlarged vehicle outline figure has a first enlarged vehicle outline figure determined by enlarging an outline of the vehicle figure by a first factor and a second enlarged vehicle outline figure determined by enlarging an outline of the vehicle figure by a second factor different from the first factor.

30. The apparatus according to claim 1, wherein the control unit controls the display to simultaneously display the vehicle figure and the tire figure.

31. The apparatus according to claim 1, further comprising:
a photographing element that photographs surroundings of the vehicle,
wherein the control unit controls the display to display the surroundings of the vehicle, the running locus, the vehicle figure and the tire figure in the top view.

32. The apparatus according to claim 1, wherein the driving information receiving unit is adapted to receive a running speed of the vehicle, and the control unit is adapted to determine a drawing position of a predicted running locus of the vehicle in the display according to the steering angle and the running speed of the vehicle received in the driving information receiving unit and to control the display to draw the running locus at the drawing position.

33. The apparatus according to claim 1, wherein the vehicle figure has an image imitating an external shape of the vehicle, and the tire figure has an image imitating an external shape of the tire of the vehicle.

34. The apparatus according to claim 1, wherein the object detecting unit intermittently detects a position of a portion of the object relative to a position of the vehicle moved with a time while changing the portion of the object with the time such that the portions of the object serially connected with one another forms an outline of the object, and the control unit is adapted to determine a plurality of marking positions of the display corresponding to the positions of the portions of the object detected by the object detecting unit, and to control the display to draw a plurality of detecting marks at the respective marking positions with the vehicle figure, the tire figure and the running locus in the top view.

35. The apparatus according to claim 11, further comprising:
an object detecting unit that detects a position of an object existing around the vehicle;
wherein the control unit produces an object detecting mark indicating the position of the object detected by the object detecting unit and controls the display to display the object detecting mark while displaying no grid figure.

36. The apparatus according to claim 11, wherein the grid figure is formed of a plurality of longitudinal lines arranged at equal intervals and a plurality of lateral lines arranged at equal intervals.

37. The apparatus according to claim 11, wherein the control unit controls the display to scroll-display the grid figure on the basis of the steering angle and the running speed of the vehicle while fixing the vehicle figure on the display.

38. The apparatus according to claim 21, wherein the control unit determines a locus position of a predicted running locus of the vehicle in the wider-area image according to the steering angle and the running speed of the vehicle, and controls the display to draw the predicted running locus placed at the locus position in the wider-area image.

39. The apparatus according to claim 21, wherein the control unit determines a locus position of a predicted running locus of the vehicle in each of the wider-area image and the enlarged image according to the steering angle and the running speed of the vehicle, controls the display to draw the running locus placed at the locus position in the wider-area image, and controls the display to draw the predicted running locus placed at the locus position in the enlarged image.

40. The apparatus according to claim 21, wherein the control unit is adapted to produce a tire figure indicating a shape of a tire of the vehicle in the top view and is adapted to control the display to display the wider-area image including the tire figure while changing a direction of the tire figure with respect to the vehicle figure according to the steering angle received in the driving information receiving unit.

41. A driving support apparatus, comprising:
a display mounted in a vehicle;
a photographing element that photographs surroundings of the vehicle;
an object detecting unit that detects a position of an object existing around the vehicle;
a driving information receiving unit that receives a steering angle of a steering wheel of the vehicle and a running speed of the vehicle; and
a control unit that produces a vehicle figure indicating a shape of the vehicle in a top view, produces an object detecting mark indicating the position of the object detected by the object detecting unit, produces an image of the surroundings of the vehicle photographed by the photographing element in the top view, produces a grid figure, and controls the display to display at least one of the vehicle figure, the object detecting mark and the image of the surroundings with the grid figure in the top view such that the grid figure is moved relative to the vehicle figure on the basis of the steering angle and the running speed of the vehicle received in the driving information receiving unit.

42. The apparatus according to claim 41, wherein the control unit controls the display not to display the grid figure when the object detecting mark or the image of the surroundings is displayed on the display.

43. The apparatus according to claim 41, wherein the control unit is adapted to produce a tire figure indicating a shape of a tire of the vehicle in the top view and is adapted to control the display to display the tire figure in the top view while changing a direction of the tire figure with respect to the vehicle figure according to the steering angle received in the driving information receiving unit.

44. The apparatus according to claim 41, wherein the control unit is adapted to determine a drawing position of a predicted running locus of the vehicle in the display according to the steering angle and the running speed of the vehicle received in the driving information receiving unit and to control the display to draw the running locus at the drawing position in the top view.

45. The apparatus according to claim 41, wherein the grid figure is formed of a plurality of longitudinal lines arranged at equal intervals and a plurality of lateral lines arranged at equal intervals.

46. The apparatus according to claim 41, wherein the control unit controls the display to scroll-display the grid figure while moving the grid figure relative to the vehicle figure, substantially fixed, in response to a movement and a running direction of the vehicle.

47. The apparatus according to claim 1, wherein the control unit produces the vehicle figure by imitating an external shape of the vehicle in a top view, produces the tire figure by imitating an external shape of the tire of the vehicle in the top view, and controls the display to display the vehicle figure and the tire figure while drawing the tire figure at a position corresponding to the tire of the vehicle.

48. The apparatus according to claim 2, wherein the object detecting unit is adapted to intermittently detect a position of a portion of the object relative to a position of the vehicle moved with a time while changing the portion of the object with the time such that the portions of the object serially connected with one another forms an outline of the object, and the control unit is adapted to determine a plurality of marking positions of the display corresponding to the positions of the portions of the object detected by the object detecting unit, and to control the display to draw a plurality of detecting marks at the respective marking positions with the vehicle figure, the tire figure and the running locus in the top view.

49. The apparatus according to claim 11, wherein the control unit controls the display to scroll-display the grid figure while moving the grid figure relative to the vehicle figure, substantially fixed, in response to a movement and a running direction of the vehicle.

50. A driving support apparatus, comprising:
a display mounted in a vehicle;
a driving information receiving unit that receives a steering angle of a steering wheel of the vehicle and a running speed of the vehicle;
an object detecting unit that detects a position of an object existing around the vehicle; and
a control unit that produces a vehicle figure indicating a shape of the vehicle in a top view, produces a tire figure indicating a shape of a tire of the vehicle in the top view, produces an object detecting mark indicating the position of the object detected by the object detecting unit, and controls the display to display the object detecting mark with the vehicle figure and the tire figure while changing a direction of the tire figure with respect to the vehicle figure according to the steering angle received in the driving information receiving unit,
wherein the object detecting unit has a set of three object detecting elements disposed on a vertical plane in a triangular arrangement on a side surface of the vehicle such that two of the three object detecting elements are set at the same height, each of the object detecting elements outputs a transmission signal in a side direction almost perpendicular to a longitudinal direction extending from a front side to a rear side of the vehicle and receives a reception signal obtained by reflecting the transmission signal on the object, and the object detecting unit intermittently detects the position of the portion of the object from the reception signals of the object detecting elements.

51. A driving support apparatus, comprising:
a display mounted in a vehicle;
a driving information receiving unit that receives a steering angle of a steering wheel of the vehicle and a running speed of the vehicle;
an object detecting unit that detects a position of an object existing around the vehicle; and
a control unit that produces a vehicle figure indicating a shape of the vehicle in a top view, produces a tire figure indicating a shape of a tire of the vehicle in the top view, produces an object detecting mark indicating the position of the object detected by the object detecting unit, and controls the display to display the object detecting mark with the vehicle figure and the tire figure while changing a direction of the tire figure with respect to the vehicle figure according to the steering angle received in the driving information receiving unit, wherein the object detecting unit has a set of four object detecting elements disposed on a vertical plane in a rectangular arrangement on a side surface of the vehicle such that two of the four object detecting elements are set at the same height, each of the object detecting elements outputs a transmission signal in a side direction almost perpendicular to a longitudinal direction extending from a front side to a rear side of the vehicle and receives a reception signal obtained by reflecting the transmission signal on the object, and the object detecting unit intermittently detects the position of the portion of the object from the reception signals of the object detecting elements.

52. A driving support apparatus, comprising:

a display mounted in a vehicle;

a driving information receiving unit that receives a steering angle of a steering wheel of the vehicle and a running speed of the vehicle;

an object detecting unit that detects a position of an object; and a control unit that produces a vehicle figure indicating a shape of the vehicle in a top view, produces a tire figure indicating a shape of a tire of the vehicle in the top view, controls the display to display the vehicle figure and the tire figure while changing a direction of the tire figure with respect to the vehicle figure according to the steering angle received in the driving information receiving unit, determines a portion of the vehicle nearest to the object on the basis of the position of the object detected by the object detecting unit, produces an enlarged vehicle portion figure indicating an enlarged shape of the portion of the vehicle, controls the display to display an enlarged image including the enlarged vehicle portion figure and a wider-area image including the vehicle figure and the tire figure, determines a marking position corresponding to the position of the object detected by the object detecting unit in each of the enlarged image and the wider-area image on the basis of the running speed and the steering angle of the vehicle received by the driving information receiving unit, determines a locus position of a running locus of the vehicle in each of the wider-area image and the enlarged image according to the steering angle and the running speed of the vehicle, controls the display to draw a first detecting mark placed at the marking position and the running locus placed at the locus position in the wider-area image, and controls the display to draw a second detecting mark placed at the marking position and the running locus placed at the locus position in the enlarged image, the second detecting mark having a size larger than a size of the first detecting mark.

\* \* \* \* \*